(12) United States Patent
Stuart et al.

(10) Patent No.: US 6,395,154 B1
(45) Date of Patent: May 28, 2002

(54) ELECTROCHEMICAL CELL USING A FOLDED DOUBLE ELECTRODE PLATE

(75) Inventors: Andrew T. B. Stuart, Toronto; Raynald G. LaChance, Notre Dame du Mont Carmel; Chris T. Bowen, Pointe Claire, all of (CA)

(73) Assignee: Stuart Energy Systems Corporation, Mississauga (CA)

( * ) Notice: Subject to any disclaimer, the term of this patent is extended or adjusted under 35 U.S.C. 154(b) by 0 days.

(21) Appl. No.: 09/578,501

(22) Filed: May 26, 2000

Related U.S. Application Data

(62) Division of application No. 09/002,118, filed on Dec. 31, 1997, now Pat. No. 6,080,290.
(60) Provisional application No. 60/034,636, filed on Jan. 3, 1997.

(51) Int. Cl.[7] .............................. C25B 9/00; C25C 7/00; C25D 17/00
(52) U.S. Cl. ........................ 204/253; 204/257; 204/255; 429/34
(58) Field of Search ................................. 204/257, 258, 204/255, 256, 259–266, 269–270, 267, 253, 268, 275.1; 429/34–38, 39

(56) References Cited

U.S. PATENT DOCUMENTS

| | | |
|---|---|---|
| 4,101,718 A | 7/1978 | Tamura et al. |
| 4,139,447 A | 2/1979 | Faron et al. |
| 4,176,018 A | 11/1979 | Faron et al. |
| 4,217,199 A | 8/1980 | Cunningham |
| 4,299,681 A | 11/1981 | Mose et al. |
| 4,305,806 A | 12/1981 | Holca |
| 4,402,810 A * | 9/1983 | Boulton et al. ............. 205/255 |
| 4,680,100 A * | 7/1987 | Morin ........................ 204/228 |
| 5,372,683 A * | 12/1994 | Kuhn-von Burgsdorff et al. ...................... 204/105 R |
| 5,709,961 A * | 1/1998 | Cisar et al. .................... 429/32 |
| 5,736,016 A * | 4/1998 | Allen ........................ 204/237 |
| 5,863,671 A * | 1/1999 | Spear, Jr. et al. ............. 429/12 |

FOREIGN PATENT DOCUMENTS

| | | |
|---|---|---|
| DE | 1246687 | 8/1967 |
| DE | 2611324 | 10/1976 |
| EP | 0029518 | 10/1980 |
| EP | 0040920 | 5/1981 |
| EP | 0500505 | 2/1992 |
| FR | 2450287 | 9/1980 |
| JP | 56054752 | 5/1981 |

\* cited by examiner

*Primary Examiner*—Donald R. Valentine
*Assistant Examiner*—Wesley A. Nicolas
(74) *Attorney, Agent, or Firm*—Lynn C. Schumacher; Hill & Schumacher

(57) ABSTRACT

The present invention relates to electrochemical cells and electrochemical systems using a one piece or unitary electrode plate hereinafter also referred to as a double electrode plate (DEP) which serves to electrically connect two adjacent cell compartments and wherein the current flow in the electrodes is parallel to the working face of the electrode. In the cell designs disclosed herein the cells are assembled as a contiguous stack of cells (cell stack) appearing similar to a filter press where the electrical connections between adjacent cells are made using the double electrode plate. In one aspect of the invention there is provided a single stack electrolyser (SSE) utilizing a folded double electrode plate to connect adjacent cells in a single stack. An insulating wall separates compartments of adjacent electrode pair assemblies connected by the double electrode plate in the SSE.

8 Claims, 15 Drawing Sheets

ELECTROCHEMICAL CELL USING A FOLDED DOUBLE ELECTRODE PLATE

CROSS REFERENCE TO RELATED U.S. PATENT APPLICATION

This patent application is a divisional patent application of U.S. patent application Ser. No. 09/002,118 filed on Dec. 31, 1997, now U.S. Pat. No. 6,080,290, which relates to U.S. Provisional Patent Application Ser. No. 60/034,636, filed on Jan. 3, 1997, entitled ELECTROLYTIC CELL AND ELECTROLYSER SYSTEM.

FIELD OF THE INVENTION

The present invention relates to the design of electrochemical cells and electrochemical systems, and more particularly to electrolysers in single stack and multiple stack configurations.

BACKGROUND OF THE INVENTION

Electrolysis is a method for production of a chemical reaction that is electrically driven by passage of an electric current, typically a direct current (DC), through an electrolyte between an anode electrode and a cathode electrode. An electrochemical cell is used for electrochemical reactions and comprises anode and cathode electrodes immersed in an electrolyte with the current passed between the electrodes from an external power source. The rate of production is proportional to the current flow in the absence of parasitic reactions. For example, in a liquid alkaline water electrolysis cell, a direct current (DC) is passed between two electrodes in an aqueous electrolyte to split water (the reactant) into the component product gases: hydrogen and oxygen where the product gases evolve at the surfaces of the respective electrodes.

The achievement of a preselected level of production involves a trade-off between increasing the operating current density and increasing the number of the cells. Due to the physical nature of the electrolytic processes, the higher the current density, the higher the energy consumption per unit of production, and so the tradeoff facing the cell designer is whether to bear the increase in capital cost of more cells or to pay higher operating costs through reduced energy efficiency. Increasing current density will also lead to more stressful operating conditions such as higher electrolyte temperature that will impose additional design requirements and added costs. In the final analysis, the trade-off is determined on a case-by-case basis by the external variables primarily driven by the cost of electricity.

In the conventional bi-polar electrolyser a voltage is applied between the end electrode of a stack of electrode plates. One side of a plate acts as an anode and produces oxygen and the other side acts as a cathode producing hydrogen in the case of electrolysis. The key implications to this in terms of current flow is that the current flow is through the stack perpendicular to the plane of the electrode (the plane of the electrode defined by the gas evolving surfaces of the electrodes) and importantly that the current flow is contained within the cell stack. Current flows in the electrode from all edges of the electrode towards the centre of the electrode plate.

In the conventional mono-polar cell design presently in wide commercial use today, one cell or one array of (parallel) cells is contained within one functional electrolyser, or cell compartment, or individual tank. Therefore each cell is made up of an assembly of electrode pairs in a separate tank where each assembly of electrode pairs connected in parallel acts as a single electrode pair. The connection to the cell is through a limited area contact using an interconnecting bus bar such as that disclosed in Canadian Patent Number 302,737 issued to A. T. Stuart (1930). The current is taken from a portion of a cathode in one cell to the anode of an adjacent cell using point-to-point electrical connections using the above-mentioned bus bar assembly between the cell compartments. The current is usually taken off one electrode at several points and the connection made to the next electrode at several points by means of bolting, welding or similar types of connections and each connection must be able to pass significant current densities. Current flows from the point of connection over the area of the electrode. Current in the electrode flows only in the plane of the electrode. Current between cells occurs outside the nominal cell stack as each cell is in a separate tank. A drawback to such connections is that they are prone to oxidation and other types of degradation resulting in significant potential drops between cells which reduce the efficiency of the electrolyser.

Most filter press type electrolysers insulate the anodic and cathodic parts of the cell using a variety of materials which may include metals, plastics, rubbers, ceramics and various fibre based structures. In many cases, O-ring grooves are machined into frames or frames are moulded to allow O-rings to be inserted. Typically at least two different materials form the assembly necessary to enclose the electrodes in the cell and create channels for electrolyte circulation, reactant feed and product removal. One of the materials is, for example, a hard engineering plastic and the other a material soft enough to allow sealing to be achieved. In large bipolar filter press systems, cell stacks could be many tens of meters in length. Such systems require hard and rigid materials with compatible coefficients of thermal expansion and minimal temperature/pressure related creep.

It would be very advantageous to provide an electrochemical system which eliminates the need for external contacts connecting adjacent electrodes, which avoids the drawbacks to conventional monopolar and bipolar systems but incorporates the advantages of each into a system, and which reduces the number of components making up the system.

SUMMARY OF THE INVENTION

It is an object of the present invention to provide an electrochemical system having the compactness and low inter-cell resistance connections inherent in bi-polar like electrochemical systems. It is also an object of the present invention to provide compact electrochemical systems in a single stack configuration and in a multi-stack configuration.

Another object of the present invention is to provide an electrochemical system provided with a unitary one piece double electrode plate for supporting an anode located in one cell compartment and a cathode located in an adjacent cell compartment with the double electrode plate adapted for use in the aforementioned single stack and multi-stack electrochemical systems.

Another object of the present invention is to provide an electrochemical cell or electrochemical system having electrolyte circulation frames which can also serve as seals in order to avoid the need for separate gaskets.

Another object of the present invention is to provide multi-purpose rigid enclosures at one or both ends of the aforementioned electrochemical systems which are in flow communication with the cell compartments. The enclosures provide structural rigidity to the system in addition to acting as reservoirs for electrolyte and providing a location for separating reaction product from the electrolyte.

A further object of the present invention is to provide a double electrode plate including an electrically conducting frame for supporting two electrodes spaced from each other but both electrodes being electrically connected by the frame. The double electrode plate may be adapted for use as a component in electrochemical systems including but not limited to energy storage devices such as batteries, energy producing devices such as acid and/or alkaline fuel cells, electrochemical systems for various electrosynthesis reactions.

An advantage of the present invention is that it provides a mono-polar electrolyser configuration system having a compact cell design with reduced inter cell resistance factors typically found in bi-polar electrolysers. Multiple stack electrolysers with power ratings of from less than one kW to several megawatts may be constructed in a single cell block in accordance with the present invention. Another advantage of the electrolysers of the present invention is that they do not require separate sealing gaskets as needed in conventional electrolysers.

The present invention relates to the design of an assembly of an electrochemical cell stack using a unitary electrode plate, hereinafter referred to as a double electrode plate (DEP), on which an anode and cathode are supported. The double electrode plate serves to electrically connect two adjacent cell compartments and wherein the current flow in the electrodes is parallel to the working face of the electrode plate. In the cell designs disclosed herein the mono-polar cells are assembled as a contiguous stack of cells (cell stack) appearing similar to a filter press where the electrical connections between adjacent stacks are made using the double electrode plate.

In one aspect of the present invention there is provided a double electrode plate for supporting two electrodes. The double plate electrode comprises an electrically conducting frame having a first portion for supporting a first electrode and a second portion for supporting a second electrode. The first electrode and the second electrode are spaced apart and electrically connected by the electrically conducting frame.

In another aspect of the invention there is provided an electrochemical system comprising at least two cells, each cell defining an anolyte chamber and a catholyte chamber, and including at least an anode electrode adjacent to the anolyte chamber, and a cathode electrode adjacent to the catholyte chamber. The anolyte and catholyte chambers each include an entrance and exit. The electrochemical system includes at least one unitary one piece double electrode plate having an electrically conducting frame, the anode electrode in one of the at least two cells being supported on a first portion of the electrically conducting frame, and the cathode electrode in one of the other of the at least two cells being supported on a second portion of the electrically conducting frame spaced from the first portion.

The present invention also provides an electrochemical system, comprising at least one cell stack including at least two cells in the at least one cell stack, each cell including an anode electrode and anolyte chamber adjacent to the anode electrode, and a cathode electrode and catholyte chamber adjacent to the cathode electrode. The electrochemical system includes rigid support members located at opposed ends of the cell stack, the rigid support members including at least first and second rigid enclosures. The anolyte chambers are in flow communication with the first rigid enclosure and the catholyte chambers are in flow communication with the second rigid enclosure.

The present invention also provides an electrochemical system comprising at least one cell stack including at least two cells, each cell including a first conducting plate supporting an anode electrode and a second conducting plate supporting a cathode electrode. The first and second conducting plates each include opposed peripheral surfaces. Each cell includes at least a first frame member sealingly engaged against one of the opposed peripheral surfaces of the first conducting plate defining an anolyte chamber. Each cell includes at least a second frame member sealingly engaged against one of the opposed peripheral surfaces of the second conducting plate defining a catholyte chamber. The first and second frame members are fabricated of a compressible elastomer-like material, and wherein the first and second frame members are compressed to form fluid tight seals when the electrochemical system is assembled.

The present invention provides a single stack electrochemical system. The system comprises n cells arranged serially in a cell stack wherein n is an integer number of cells greater than or equal to 2, each cell including at least one anode electrode and an anolyte chamber adjacent thereto and a cathode electrode and a catholyte chamber adjacent thereto. Two cells are located at opposed ends of the stack with one of the two cells including at least a contact anode electrode and the other of the two cells including at least a contact cathode electrode. The contact anode and contact cathode electrodes are adapted to be connected to a power supply. An insulating member for insulating adjacent cells in the stack is provided. The system includes at least n−1 double electrode plates, each double electrode plate including a least an electrically conducting frame having a length and a width, and a first portion for supporting an anode electrode located in one of the cells and a second portion for supporting a cathode electrode located in an adjacent cell, and a web portion between the anode and cathode electrodes electrically connecting the electrodes. At least a portion of the web portion is located exterior to the cells containing the anode and cathode electrodes supported by the double electrode plate. The double electrode plate being folded substantially down a middle of the web portion, and when a voltage drop is developed between the two contact electrodes current is collected along the length of the electrically conducting frames and flows from cell to cell in a plane of the double electrode plates across the width of the electrically conducting frames and the anode and cathode electrodes.

The single stack electrochemical system includes first and second rigid support members located at opposed ends of the cell stack, the cell stack being compressed between the first and second rigid support members, the first rigid support member defining a first enclosure and the second support member defining a second enclosure, the first enclosure being in flow communication with the first and second flow passageways in flow communication with each anolyte chamber in the cell stack, and the second enclosure being in flow communication with the third and fourth flow passageways in flow communication with each catholyte chamber in the cell stack.

The electrochemical cells or systems using the double electrode plates constructed according to the present invention provide the advantages of compactness of size and low inter-cell resistance factor found in conventional bi-polar electrolysers and provide lower cost mono-polar electrolysers. Another advantage of the present invention is that using the multiple stack electrolyser (MSE) configuration, cell assemblies of 1 MW or larger can be constructed in a single cell block.

BRIEF DESCRIPTION OF DRAWINGS

The electrochemical cells and electrochemical systems constructed in accordance with the present invention will now be described, by way of example only, reference being made to the accompanying drawings, in which:

FIG. 3b is a view along the line 3b—3b of FIG. 3a;

FIG. 6b is a view along the line 6b—6b of FIG. 6a;

DETAILED DESCRIPTION OF THE INVENTION

The present invention relates to the design of, and methods of electrically connecting, arrays of electrochemical cells (cell stacks) in a filter-press type arrangement to form a cell block. Specifically, the invention relates to the design of electrochemical cells, electrochemical systems and cell electrodes including their supports and reactant/product transport conduits and several methods of electrically connecting the cells, stacks and/or blocks to form a functional electrochemical systems, e.g. an electrolyser in the case of electrolysis. In addition, the present invention provides unique and advantageous designs for various components used in the electrochemical system. The present invention discloses a methodology for constructing electrochemical systems with substantial flexibility in respect of providing several configurations of electrical (bus) connections, thereby providing versatility in selecting the size of the direct current (DC) power supply.

As used herein the term "cell" or "electrochemical cell" refers to a structure comprising at least one pair of electrodes including an anode and a cathode with each being suitably supported within an enclosure through which electrolyte is circulated and product is disengaged. The cell includes a separator assembly having appropriate means for sealing and mechanically supporting the separator within the enclosure. Multiple cells may be connected either in series or in parallel to form cell stacks and there is no limit on how many cells may be used to form a stack In a stack the cells are connected in the same way, either in parallel or in series. A cell block is a unit which comprises one or more cell stacks and multiple cell blocks are connected together by an external bus bar. A functional electrolyser comprises one or more cells which are connected together either in parallel, in series, or a combination of both.

Multi-Stack Electrochemical System (MSE)

Figure 1:
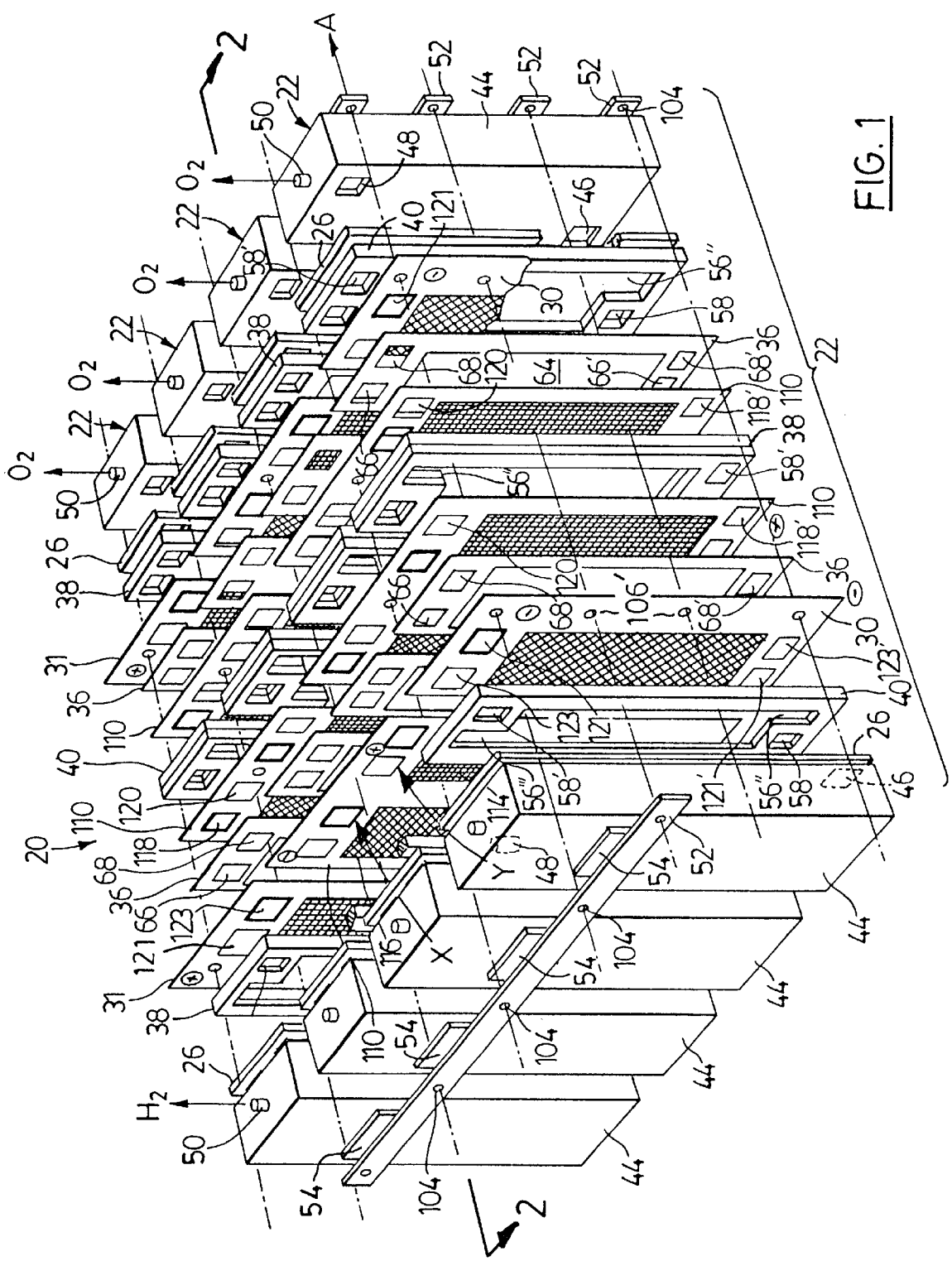
FIG. 1 is an exploded perspective view of a multiple stack electrochemical system (MSE) consisting of the series connection of four stacks consisting of two cells each connected in parallel.
Figure 2:
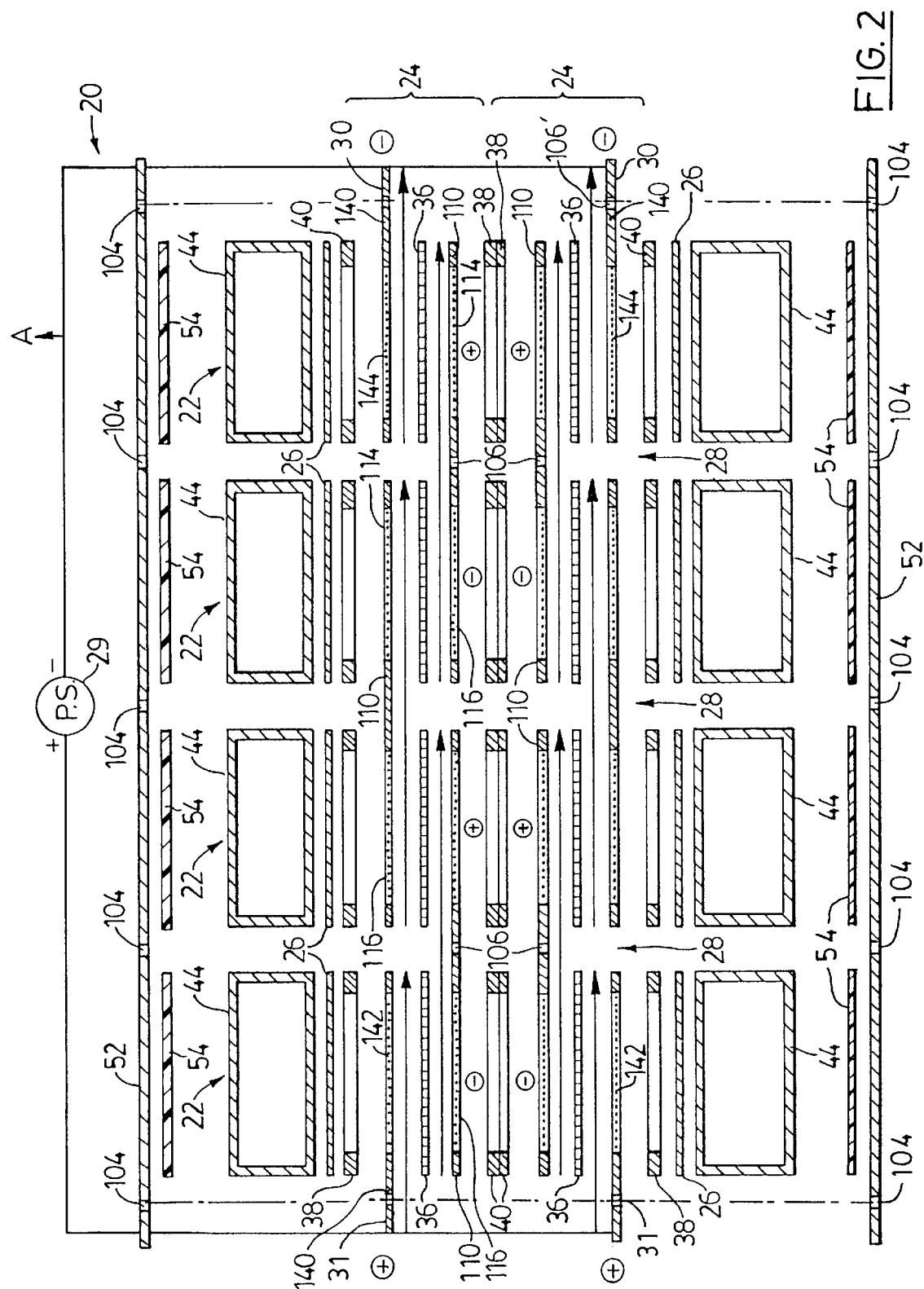
FIG. 2 is a horizontal cross section along line 2—2 of FIG. 1 showing the electrical current path in the cell block.

FIGS. 1 and 2 illustrate a preferred electrochemical system shown generally at 20 constructed according to the present invention which is referred to hereinafter as a multiple stack electrochemical system (MSE). The cross sectional view illustrated in FIG. 2 shows the electrode polarity and direction of current flow through each individual cell stack and also between the individual cell stacks which distinguishes this electrolyser configuration as a mono-polar electrochemical system. Electrochemical system 20 is shown as a cell block comprising four cell stacks 22 with series connections between cell stacks and the two electrolysis cells of each stack connected in parallel. Each stack 22 is provided with two cells 24, best seen in FIG. 2 but it will be understood that each stack may comprise any number of cells in the direction of arrow A. The height of the cell stack may be varied.

The anode and cathodes in adjacent cells 24 (excluding the cells in the two end cell stacks 22) are provided by double electrode plate 110 comprising an anode 114 supported one half of the double electrode plate and a cathode 116 supported on the other half of the double electrode plate. The cells in the stack at the right end of the electrolyser in FIG. 2 comprise anodes 114 on one half of double electrode plates 110 and cathodes 144 mounted on single electrode plates 30. The cells in the cell stack at the left end of electrochemical system 20 in FIG. 2 comprise cathodes 116 supported on one half of double electrode plates 110 and anodes 142 supported on single electrode plates 31. The structure of the double electrode plates 110 and single electrode plates 30 and 31 will be described in more detail hereinafter.

Each stack 22, as shown in FIG. 2, comprises two cells including two anodes and two cathodes but may include any number of cells in the direction defined by arrow A which is transverse to the direction of current flow through block 20. In each compartment an anolyte frame 38 is located adjacent to the anode to define an anolyte chamber and a catholyte frame 40 is located adjacent to the cathode defining a catholyte chamber. Anolyte frame 38 is essentially identical in structure to catholyte frame 40 and may be generally be referred to as electrolyte circulation frames and will be discussed in more detail hereinafter. It is noted that in the embodiments described and illustrated herein the catholyte frames need not be identical in structure to the anolyte frames but lower production costs per unit are realized when they are identical.

Each anode and cathode chamber in a given cell (in the direction of arrow A, see FIG. 2) is separated by a separator 36. The role of separator 36 is to reduce mixing of the different electrolysis products produced in the anode and cathode chambers and will be further described hereinafter. As best seen in FIG. 2, adjacent electrodes of like polarity are separated by two electrolyte frames. For example, in the middle compartment of the stack 22 at the far right hand side of the electrochemical system includes essentially two anode frames 38 separating the two adjacent anodes 114 in the two double electrode plates 110. In electrochemical systems with more than two cells per stack these double frames would alternate with the single frames associated with the single electrode plate electrodes along the stack in direction A it will be understood that thicker single frames than 38 and 40 as shown could also be used to separate adjacent anodes or cathodes.

Electrochemical system 20 includes an end box 44 at both ends of each stack 22. Referring specifically to FIG. 1, each end box 44 is provided with a lower aperture 46 and an upper aperture 48 in the side of the box adjacent to the anolyte or catholyte chambers. A gas outlet 50 at the top of each box 44 provides an outlet for collecting the various gases evolved during the electrolysis reaction, i.e. $H_2$ and $O_2$ when the reaction is water electrolysis. The cell stacks 22 and entire cell block 20 must be held together with sufficient force so that a fluid tight seal is made to prevent leaking of electrolyte or gases. The use of a rigid structural element such as a rectangular tube used to form end box 44 with clamping bars 52 and tie rods and associated fasteners (not shown) provides a superior structure for obtaining an even load distributing surface to seal the stacks 22 at modest clamping pressures. Electrically insulating panels 54 are sandwiched between the outer surfaces of end boxes 44 and clamping bars 52 in order to prevent the end boxes from being electrically connected to each other by the clamping bars. Alternatively, instead of using several panels 54 as shown in FIGS. 1 and 2, a single, longitudinal insulating panel (not shown) extending across all the end boxes may be used.

Figure 4B:
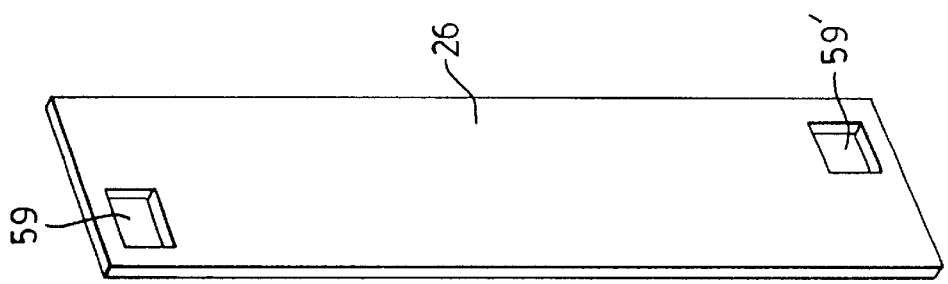
FIG. 4b is a perspective view of an insulating gasket for use in the MSE of FIG. 1.

With reference to FIG. 2, an insulating planar gasket 26 is disposed at the end of each stack between the electrolyte frame 38 or 40 and the end box 44 for insulating the face of end box 44 from contact with electrolyte. Gasket 26 is provided with an upper aperture 59 and a lower aperture 59' (see FIG. 4b) in registration with apertures 48 and 46 respectively in end box 44 (see FIG. 1) for fluid circulation.

The rigid end boxes 44 serve several functions including providing a return channel for electrolyte flowing out from the top of the cell in addition to serving as a gas/liquid separation device. They may also provide a location for components used for controlling the electrolyte level (liquid level sensors) and temperature (for example heaters, coolers or heat exchangers). In addition, with appropriate sensors in the end boxes individual cell stack electrolyte and gas purity may be monitored. Also, while most of the electrolyte is recirculated through the electrolyser, an electrolyte stream may be taken from each end box 44 to provide external level control, electrolyte density, temperature, cell pressure and gas purity control and monitoring. This stream would be returned to either the same end box or mixed with other similar streams and returned to the end boxes. Alternatively, probes may be inserted into the end boxes to control these parameters. It will be understood that known electrochemical systems may be modified to include the end boxes disclosed herein by way of retrofit.

For electrolysis cells used in electrosynthesis, a liquid can be fed forward from one cell block to the next cell block between adjacent boxes in order to assist conversion per pass. The rigid end boxes 44 may be manufactured from a variety of materials suitable for alkaline or acid based electrochemical systems including steel, stainless steel, nickel or plastics with, if necessary, appropriate reinforcements.

Figure 3B:
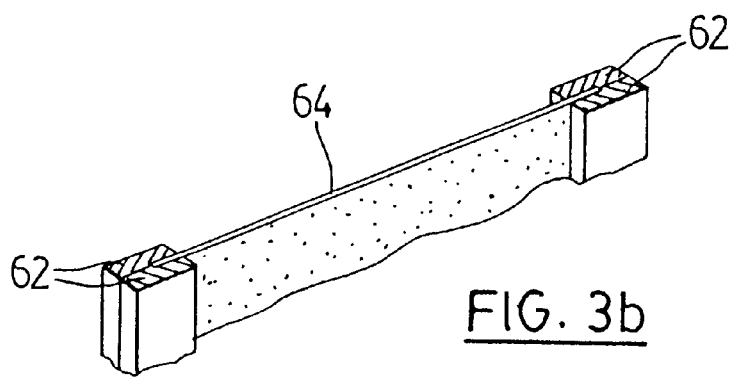
Figure 3A:
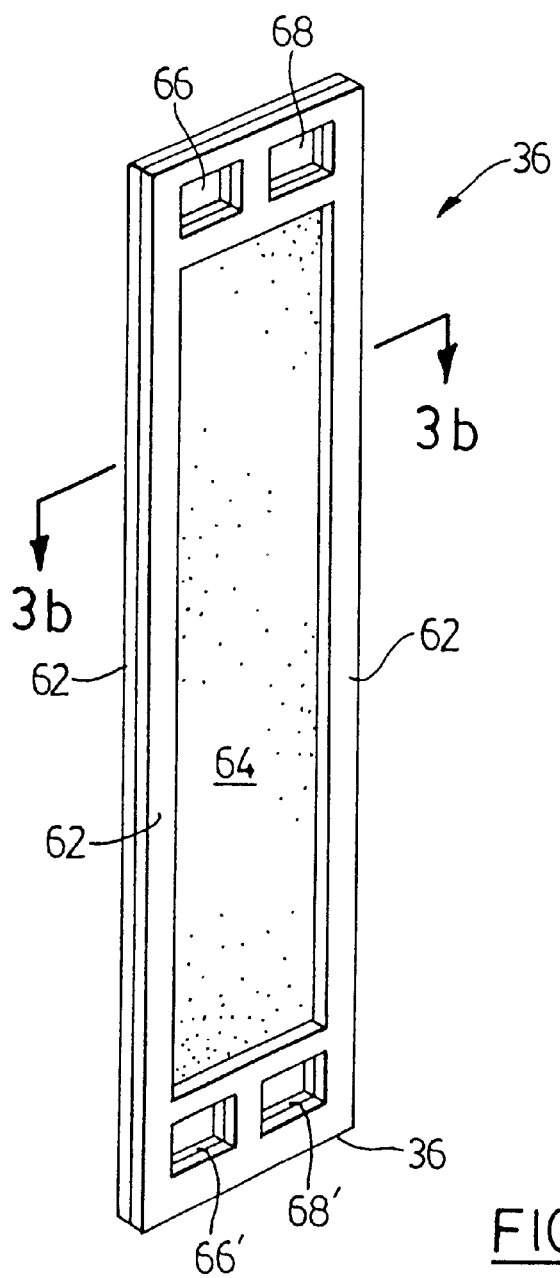
FIG. 3a is a perspective view of a gas separator assembly constructed in accordance with the present invention.

The structure of separator assembly 36 is more clearly visible in FIGS. 3a and 3b. Separator assembly 36 includes a pair of identical peripheral elastomer or elastomer-like frames 62 welded or otherwise joined together with an electrolysis product separator 64 sandwiched between the two frames. Frames 62 are each provided with a pair of upper adjacent apertures 66 and 68 and a pair of lower apertures 66' and 68' with associated apertures in the two frames in registration when separator 36 is assembled. It will be understood that the peripheral elastomer frame of the separator assembly 36 may be a single unitary elastomer frame instead of two pieces molded with a slot to accept separator 64.

The choice of material of construction of separator 64 will depend upon the electrochemical reaction taking place in the electrochemical system. For electrolysis reactions in which product gases are produced, separator 64 is a gas separator diaphragm which may or may not be a membrane. A separator 64 which can achieve a low inter-electrode resistance factor (ohm-cm$^2$) will allow for increased current densities for a fixed cell voltage. For alkaline water electrolysis, gas separator diaphragm sheet 64 is preferably porous and fabricated from a material such as polyphenylene sulphide or other similar electrolyte resistant materials which may be surface treated to reduce the inter-electrode resistance and reduce gas permeability. Diaphragm sheet 64 is preferably porous for electrochemical systems used for applications in which the electrochemical reactions are prone to producing chemical gradients in the electrolyte circulation system, e.g. $H_2$ and $O_2$ in the case of water electrolysers. The porous separator diaphragm sheet permits electrolyte to cross back and forth across the membrane between the anode and cathode compartments to reduce concentration gradients but inhibits the electrochemical products produced in each compartment crossing. The use of diaphragm materials characterized by sufficient porosity to permit electrolyte mixing but prevents excessive product mixing avoids the need for special electrolyte mixing systems added on to the electrolyser. This is a significant improvement over known electrochemical systems which incorporate low porosity separators such as asbestos which require equipment to mix the anolyte and catholyte.

Frames 62 are preferably fabricated of a resilient or compressible elastomer or elastomer-like material (or functional equivalents thereof) so that the frame advantageously acts as a gasket for sealing. By using elastomer materials with suitable hardness a liquid-tight seal can be readily formed when assembled thereby avoiding the need for gaskets typically required in commercial electrolysers since these electrolysers use harder, incompressible materials as frames. Therefore, cell frames 62 can seal directly to the double electrode plate 110 without a gasket if a suitably compressible elastomer material is used.

Figure 4A:
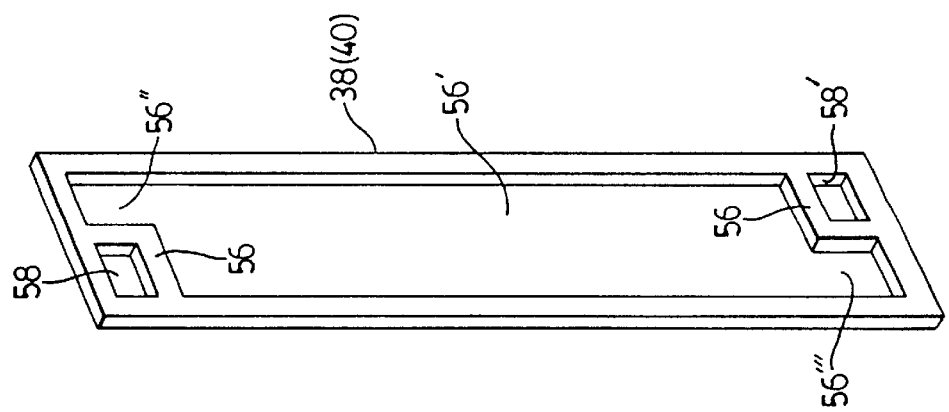
FIG. 4a is a perspective view of an electrolyte frame for use in either the multiple stack electrochemical system (MSE) of FIG. 1 or in the single stack electrolyser (SSE) of FIG. 7.

An electrolyte frame is shown in FIG. 4a and may be used both as anolyte frame 38 and catholyte frame 40. Frame 38 is provided with webs 56 at each end defining an upper aperture 58 and adjacent gap 56" and a lower aperture 58' and adjacent gap 56'". The central area 56' of the frame defines the reaction chamber adjacent to the actual anode or cathode electrode with gaps 56'" and 56' providing fluid entrance and exit ports into and out of the reaction chambers. Similarly, the insulating panel or gasket 26 shown in FIG. 4b described above is provided with apertures 59 and 59' which are in registration with apertures 58, 58' and gaps 56" and 56'" in frames 38 (40) in the assembled electrolyser.

The material of construction of frame 38 preferably has both the properties of a rubber gasket and the hardness of a suitable engineering plastic and may be the same elastomer material used to construct frame 62 in gas separator diaphragm assembly 36. Such materials can be processed in a number of ways including die cutting from extruded material or injection moulding. The electrolyte frames 38 shown in FIG. 4a as well as frames 62 of separator 36 may be readily recycled. The use of electrolyte circulation frames fabricated of elastomer or elastomer-like materials serves both the purposes of insulating frame and gasket to support the necessary electrode plates and separators which reduces the part count and the material count of the electrolysis cell system and allows for low cost material processing. A further advantage of this design is the compatibility of the elastomer frame gaskets with the metal electrode plates. No additional gasket is required. By turning the part upside down (rotating the face 180 degrees) the position of the two sets of openings and hence the location of the open channel is displaced. In this way both anode and cathode frames may be produced using a common frame part. It will be understood that known electrochemical systems may be modified to include the elastomer or elastomer-like electrolyte circulation frames disclosed herein by way of retrofit.

Figure 5:
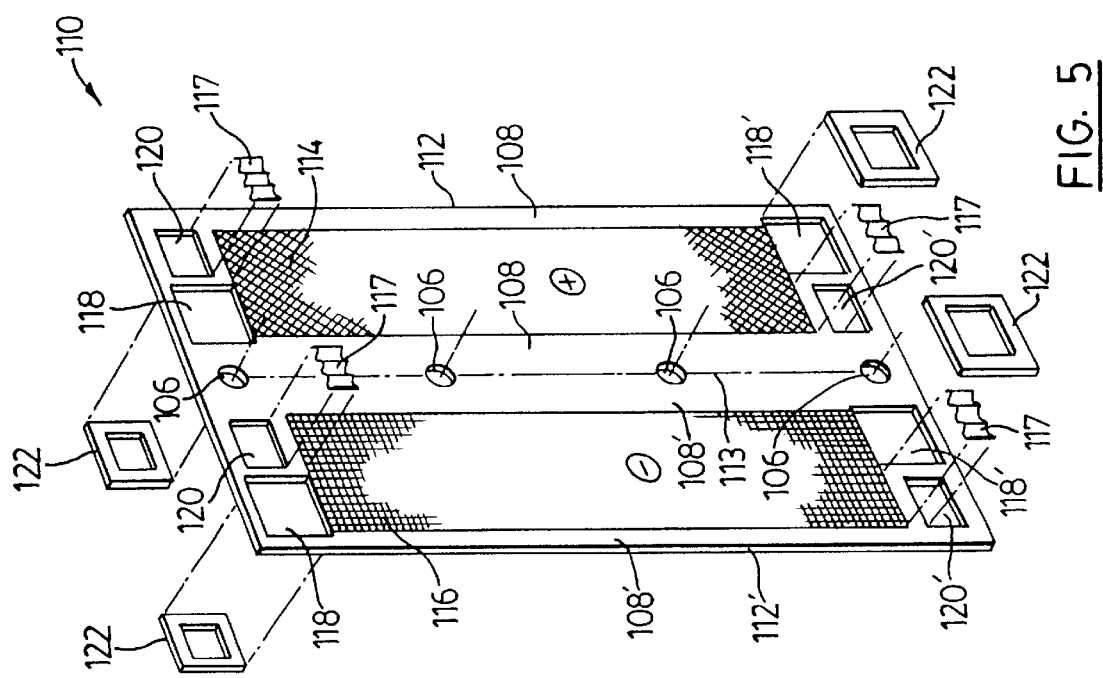
FIG. 5 is a perspective view of a double electrode plate (DEP) for use in the multiple stack electrolyser (MSE) of FIG. 1.

A more detailed view of the double electrode plate (DEP) 110 in FIG. 1 is shown in FIG. 5. Double electrode plate 110 is preferably a single-piece metallic sheet of suitable thickness and of a material sufficiently inert to chemical attack from the electrolytes and electrolysis reaction products. Double electrode plate 110 is designed to fulfill several purposes including supporting the anode electrode 114 and cathode electrode 116. Double electrode plate 110 comprises a first support frame 112 and a second support frame 112' contiguous with frame 112 down a shared border 113 (shown in broken line). Plate 110 may be made of for example nickel plated steel and an anode 114 is attached to support frame 112 and a cathode 116 is attached to support frame 112'. Support frame 112 defines a planar periphery 108 and support frame 112' includes a planar periphery 108'. Anolyte frames 38 and 40 seal on one side of plate 110 around periphery 108 and 108' and the gas separator assembly 36 seals on the other side of the plate around the periphery when the stack is assembled and clamped together.

Plate 110 includes a pair of apertures 118 and 120 at the upper end of the plate and a pair 118' and 120' at the lower end. The distance between the anode 114 and cathode 116 is preferably maintained as short as possible, typically in the range from about 1 mm to about 10 cm, preferably less than 5 cm, this distance being referred to as the inter-cell spacing and is related to gap 28 of FIG. 2. Plate 110 is provided with several spaced holes 106 spaced along the length of the electrode in the solid portion between the cathode and anode sections. Holes 106 are aligned with gaps 28 in FIG. 2 in the assembled electrolyser and tie rods (not shown) pass through these holes and through holes 104 located in clamping bar 52. The ends of the tie rods may be threaded so that the stack can be compressed by tightening the nuts located at the end of the tie rods.

Apertures 118 and 118' are larger than apertures 120 and 120' and hold an elastomeric insert 122. The function of insert 122 is to seal the fluid flow in the channels defined by apertures 118 and 118' from the product gases produced by the electrodes and to prevent the formation of an electrical circuit with the neighbouring electrodes and hence the possibility of electrolysis occurring in the conduits. The other smaller apertures 120 and 120' define channels or conduits open to pass gasses from the electrolyte frames 38 and 40. By turning the part upside down (rotating the face 180 degrees) the position of the two sets of openings and hence the location of the open channel is changed. In this way the electrode connections for the block of cells shown in FIG. 1 is created using a unitary double electrode plate.

With reference to FIG. 5, metal channel supports 117 are attached to double electrode plate 110 to prevent the gaps 56" and 56'" in frame 38 (FIG. 4a) from being squeezed closed when the cell is assembled under sufficient pressure to provide a fluid seal. These supports may also be inserted and held in place within the gap 56" of the frames 38 and 40.

In the case in which the anodes and cathodes are separate pieces attached to the frames 112 and 112', the plate 110 may be made of a low cost electrically conducting material, such as low carbon steel, and surface treated, such as nickel plated, as necessary to obtain suitable chemical resistant characteristics. The separate electrochemically active anode 114 is then connected to frame 112 and cathode 116 is attached to frame 112'. A wire grid is shown in the present Figures as the substrate for the anode and cathode. Since the anode and cathode occupy separate areas of the double electrode plate the different surface activation (if needed) of each type of electrode can be applied relatively easily and at low cost to one or both sides by methods such as electrodeposition, dipping or spraying.

Alternatively the double electrode plate and electrodes may be produced as a unitary piece with two different sections that are electrochemically activated to form the anode and cathode. For example, the plate 110 could include perforated sections which can be activated with the appropriate materials to produce the anode and cathode. Either type of configuration is a significant advantage over current mono-polar and bi-polar systems. In bi-polar systems, the anode activation is typically applied to the anode activation substrate which then is bound to a bi-polar wall; the cathode activation is similarly applied to the cathode activation substrate which is then attached or connected to the bi-polar wall. These connections often lead to losses in the chemical integrity of the electrode assembly. In conventional monopolar systems additional supports are required to conduct electricity to and away from the electrodes. Therefore, when referring to the electrodes as being "supported" by the single or double plate electrodes, it will be understood that this term is meant to cover all possible configurations, including, but not limited to, separate electrodes attached directly to the SEP and/or DEP electrically conducting frames, the DEP and/or SEP each being constructed of materials that can function by themselves as the electrodes, or the DEP and/or SEP may be made of a material that can be readily coated or otherwise treated with materials that function as the different electrodes.

The ohmic loss through the double electrode plate is directly proportional to the thickness of the electrode. This thickness can be as low as approximately 0.25 mm for electrodes carrying 100 amperes or more per vertical foot of electrode. It has been calculated that, for the ohmic voltage drop commonly found in typical mono-polar cell connections, an 80% reduction in the thickness of the current conductors can be obtained. The thinner conductor has a number of significant advantages including lower cost for material processing (conventional stamping, progressive stamping, numerical control stamping, roll die forming, etc.), it has less mass and can be more easily handled in subsequent processing steps, and it allows a higher current density per equivalent volume.

In order to achieve the optimum production of hydrogen per square meter of electrode surface area, the aspect ratio (height to width) of the double electrode plate is preferably greater than unity and in practice is as high as is practicable for the following reasons. Since the current flow is parallel to the electrode plate, for a given electrical resistance the plate needs to be thicker as the active electrode area becomes wider. In addition, for a given operating current density, as the plate becomes wider, the current rating increases for the entire double electrode plate. For a given ohmic loss between the anodic and cathodic portions, the plate must become thicker. Thus, in order to increase the total current rating of the plate, while retaining the same ohmic loss and current density, a tall and narrow structure is preferred; alternatively, by increasing the aspect ratio (length to width), thinner electrode materials can be used. This is of particular advantage for electrochemical devices which require expensive materials and are constrained in respect of current density (or ohmic losses).

Figure 6:
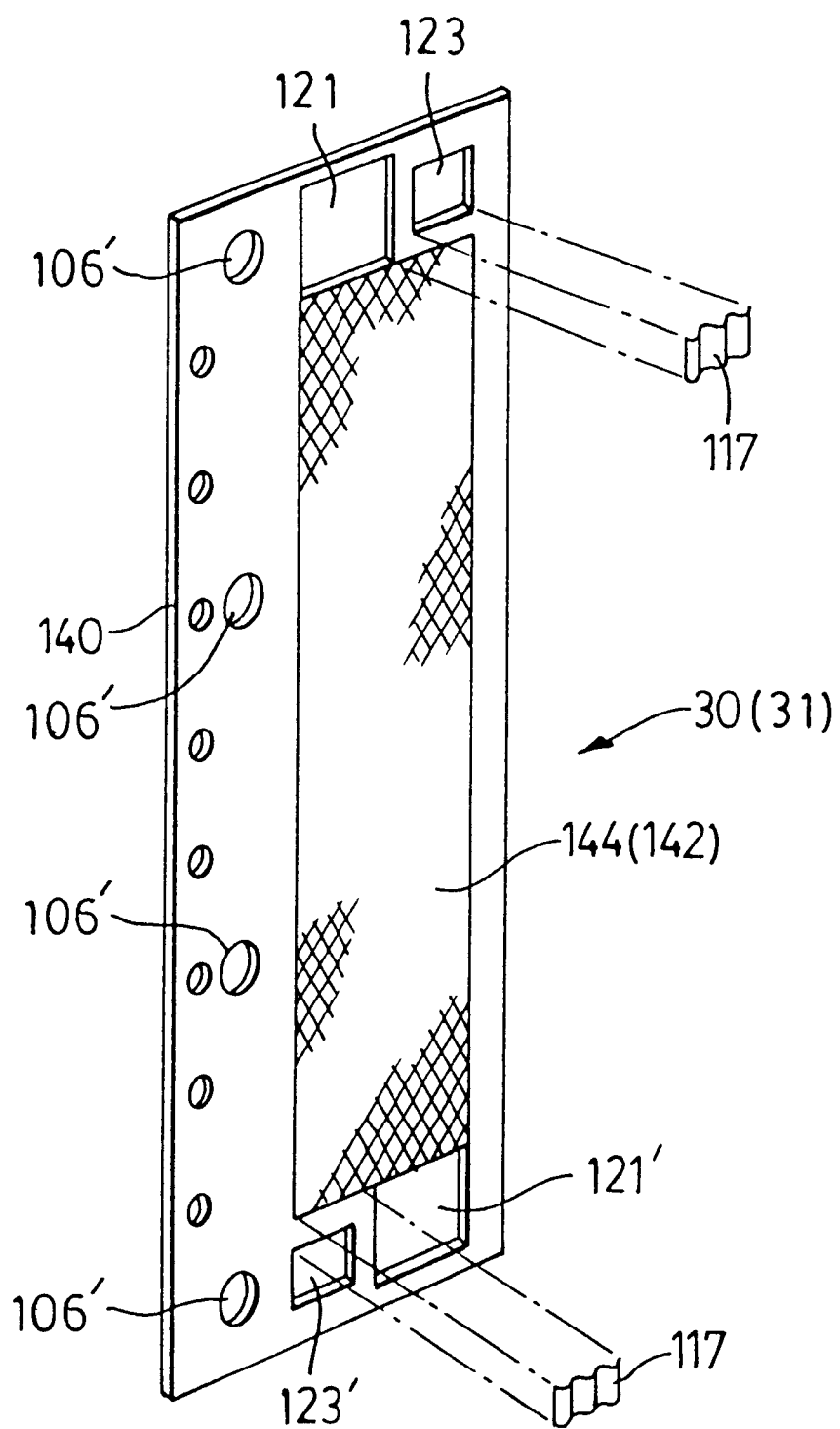
FIG. 6 shows a single electrode plate (SEP) used in the multiple stack electrolyser (MSE) of FIG. 1.

FIG. 6 shows the single electrode plates 30 and 31 that are used to hold the cathodes 144 and anodes 142 respectively in the cells in the two end stacks and to make the electrical connection to the multiple stack electrolyser from power supply 29. Single electrode plates 30 and 31 are identical in structure with the only difference being the cathodes 144 are attached to plates 30 and anodes 142 are attached to plates 31. Plate 30 comprises a metallic sheet having a planar frame 140 to which a conductor from power supply 29 is attached. Electrode plate 30 is provided with upper apertures 121 and 123 and corresponding lower apertures 121' and 123'. Metal channel supports 117 are welded to frame 140 to prevent the gaps 56" and 56'" in frame 38 (FIG. 4a) from being squeezed closed when the cell is assembled. In the multi-stack electrolyser (MSE) 20 of FIG. 1 the single electrode plates 30 are located in the outermost or end stacks and the number of electrodes 30 required in each of the two outer-most stacks 22 is equal to the number of cells per stack. Holes 106' located along the edge of frame 140 are in registration with the holes 104 located adjacent the ends of clamping bars 52 (FIG. 1) for securing the stack together.

Referring again to FIG. 2, when electrolyser 20 is assembled cell stacks 22 are isolated from each other by air gaps 28. The conducting web portion 108 and 108' between the anode and cathode on each electrode 110 (FIG. 5) has a preselected width which is determined by the spacing between adjacent stacks. A power supply 29 is connected to frame 140 of the single electrode plates 30 at the ends of the block and the polarities of the different electrodes through the block are indicated.

It will be understood that similar components have been given different numerical designations and this is intended to reflect the multiple functional uses of the component and not necessarily structural differences. For example, anolyte frame 38 and catholyte frame 40 are identical but frame 38 defines an anolyte chamber and frame 40 defines the catholyte chamber. For example, in the right hand stack 22 in FIG. 1, the middle anolyte frame 38 is rotated 180° about its vertical axis relative to the catholyte frames on either side of it. Similarly, single electrode plates 30 and 31 are identical except plate 30 has cathode 144 attached to it and plate 31 has anode 142 attached to it.

In each stack the spaced upper apertures in the electrode plates, electrolyte frames and gas separator diaphragm assembly are in registration to define two fluid flow paths through the stack with the first passageway communicating through aperture 48 in the end box 44 at one end of the stack and the second passageway communicating through the corresponding aperture 48 located in the end box 44 at the other end of the stack. For example, referring to FIG. 1, the first, upper right hand passageway in the end stack 22 at the right hand side of the block is defined by aperture 48 in the end box 22 at the farthest right hand side of the drawing (from which $O_2$ is collected), aperture 59 in panel 26 (FIG. 4b), aperture 58' in catholyte frame 40, aperture 121 in single electrode plate 30, aperture 68 in gas separator diaphragm 64, aperture 120 in double electrode plate 110, gap 56" in anolyte frame 38, aperture 120 in DEP 110, aperture 68 in gas separator diaphragm 64, aperture 121 in single electrode plate 30, aperture 58' in catholyte frame 40. In stacks with more than two cells the additional anolyte chambers could all be connected in the same way by this first passageway.

This upper right hand passageway is the exit passageway for electrolyte laden with $O_2$ gas (for the case of water electrolysis) exiting the middle anolyte chamber through gap 56" through the passageway to the end box 44 through aperture 48. The anolyte enters the cells through aperture 46 from the end box 44 at the right hand side of the Figure and travels through the lower passageway defined by the apertures in the cell components (diagonally across from the upper passageway) until it reaches anolyte frame 38 whereupon it enters the anode chamber through gap 56'" (not seen in FIG. 1). $O_2$ is evolved during operation of the stack and removed from the electrolyte once it returns to the end box 44. It is noted this first passageway is not in flow communication with the end box at the other end of the stack from which $H_2$ is collected so that the oxygen laden electrolyte can not enter this other end box and mix with the hydrogen.

The other adjacent upper apertures in the various stack components define the flow pathway for $H_2$ laden electrolyte exiting the catholyte chambers defined by frames 40 through gaps 56'". The lower passageway through the cells diagonal to the upper $H_2$ return passageway between the end boxes 44 carries electrolyte into the catholyte cell compartments. Referring again to FIG. 1, the electrolyte exiting the aperture 46 (shown in ghost outline) in the left most end box in the stack 22 along the bottom of the Figure enters each catholyte chamber defined by frames 40 through gaps 56" and returns to the same end box 44 by the upper 48 (shown in ghost outline). The $H_2$ is collected from the electrolyte during its residence in the end box.

Figure 6A:
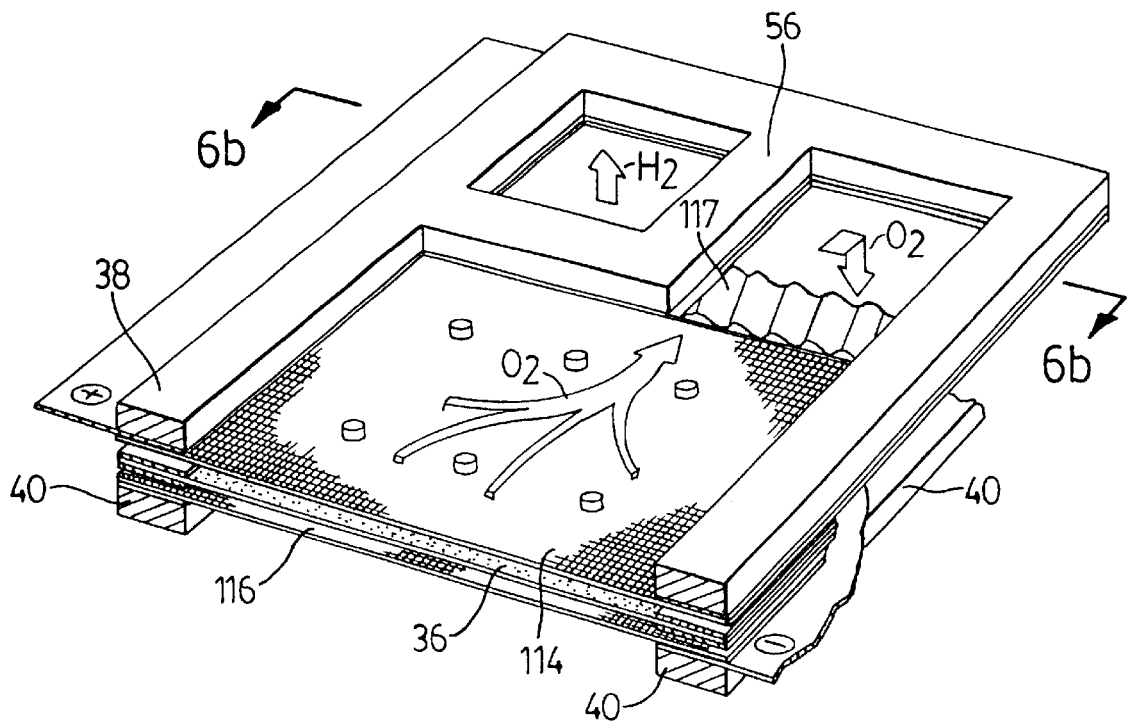
FIG. 6a is a perspective, cut-away view of a portion of a cell compartment showing the flow path for gas laden electrolyte through the cell compartments and into the passageways.
Figure 6B:
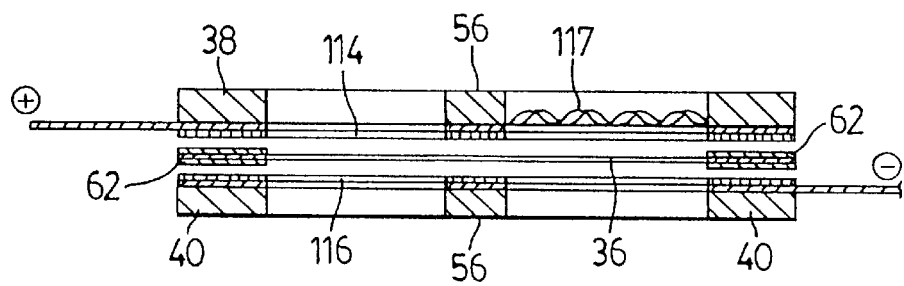

In the aforementioned stack components, the location of the upper (or lower) apertures which define the electrolyte transport conduits into end boxes are shown in a "kitty corner" design, in other words flow in a particular circulation frame enters at the bottom of one side and leaves at the top of the opposite side, see FIG. 6a. It will be understood that alternative geometries may be used, for example a design may be used in which the entrance and exit conduits are on the same side of the frame/electrode/gas separator assembly so that fluid leaves from the same side of the assembly as it enters.

The smallest possible electrolyser fully utilizing the double electrode plate 110 would require only two cells with one double electrode plate having the support frame with the cathode attached thereto located in one cell and the other support frame with the anode attached located in the second adjacent cell. In addition, it will be understood that a separator is not essential in all electrochemical systems in which the double electrode plate, the elastomer-like circulation frames or the end boxes disclosed herein may be used. The separator is only essential in applications where it is necessary to reduce or minimize mixing of electrosynthesis products (or other components present in the anolyte and catholyte). The non-limiting example given above was for water electrolysis which requires careful handling to minimize the amount of mixing of hydrogen and oxygen. Other electrochemical processes are not limited by the necessity of a separator. In the absence of a separator the anode and cathode electrodes essentially share the same compartment.

Referring again to FIG. 1, two adjacent cells X and Y are shown with a double electrode plate 110 shared between the cells with the cathode 116 in cell X and the anode 114 in cell Y so that the double electrode plate 110 is positioned between the two adjacent mono-polar cells. This structure eliminates the need for an additional inter-cell bus bar connection between the mono-polar cells. Thus, the use of double electrode plate 110 facilitates current flow between many adjacent mono-polar cell stacks without the need for complex inter-cell connectors.

This type of connection between adjacent cells is highly advantageous over the conventional or prior art layout of cells in which the connections between the anode and the cathode of adjacent mono-polar cells are made by cable or a solid metal bus bar. This requires a contact to be made and maintained during the operating life of the cell, an expense added to by having to design and supply material for this purpose. These connections are avoided with the present double electrode plate design. The inventors have found that the reduction in cell operating efficiencies associated with the prior art configurations are reduced using the double electrode plate designs. For example, contact resistance is reduced as are losses due to the conductors themselves, and the cell mass is reduced and stresses on the plates caused by welding or other material bonding techniques are reduced. The contact resistance should be stable over time and not degrade due to oxidation, heat cycling or bolt/weld failure.

More specifically, the design of double electrode plate 110, gas separator diaphragm assembly 36 and electrolyte frames 38 provides a significant reduction in the depth behind each electrode from the current state of the art of about 12.7 mm to less than about 3.75 mm. This provides an obvious economic benefit but provides an additional benefit in that the total stack thickness, containing several double electrode plates in parallel, is reduced. For example, for a double electrode plate 110 rated at 1000 amperes, only 50 double electrode plates in parallel are necessary to obtain 50,000 amperes direct current. This is more readily obtainable using elastomers as frames when the spacing between the double electrode plate is reduced as proposed herein. This reduction in stack thickness, for a given electrochemical production, allows reduced quantities of spring devices required to keep the cell leak-tight.

The double electrode plates disclosed herein provide uniform current distribution within any electrode pair of adjacent cells as current flows directly between the inner anode edge of the electrode plate in one cell to the inner cathode edge of the same electrode plate located in the adjacent cell. Studies performed on a rig of thirty-three 2 inch segmented anodes over a 66 inch high structure showed a uniform current distribution as a function of height for gaps behind the gas evolving electrode between 0.318 cm and 2.5 cm. The gap is the depth of the anolyte and catholyte chambers. Therefore, the current distribution was not a function of height of the electrode.

Figure 14:
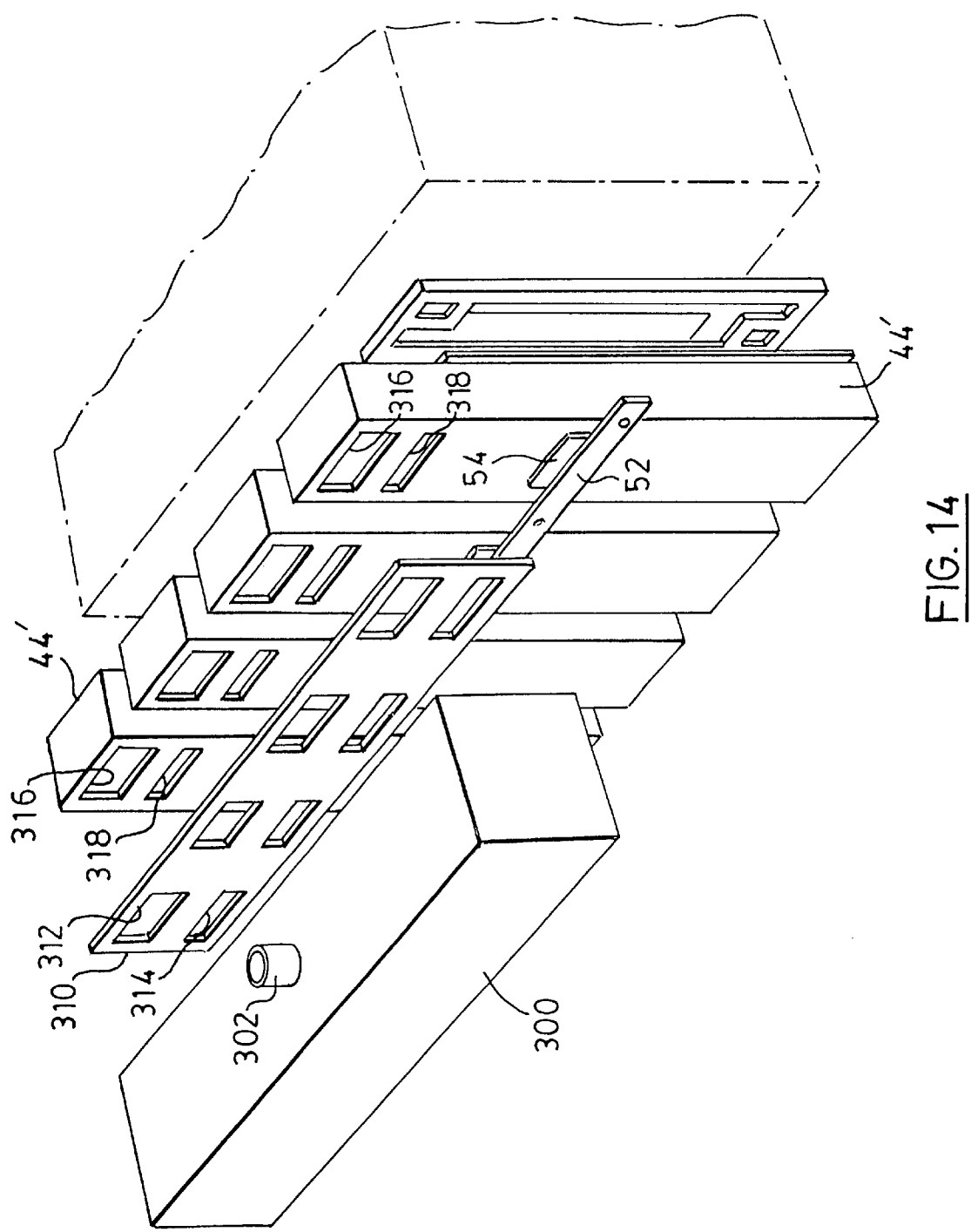
FIG. 14 is a perspective, exploded view of an alternative embodiment of an MSE electrolyser provided with a header box.
Figure 15:
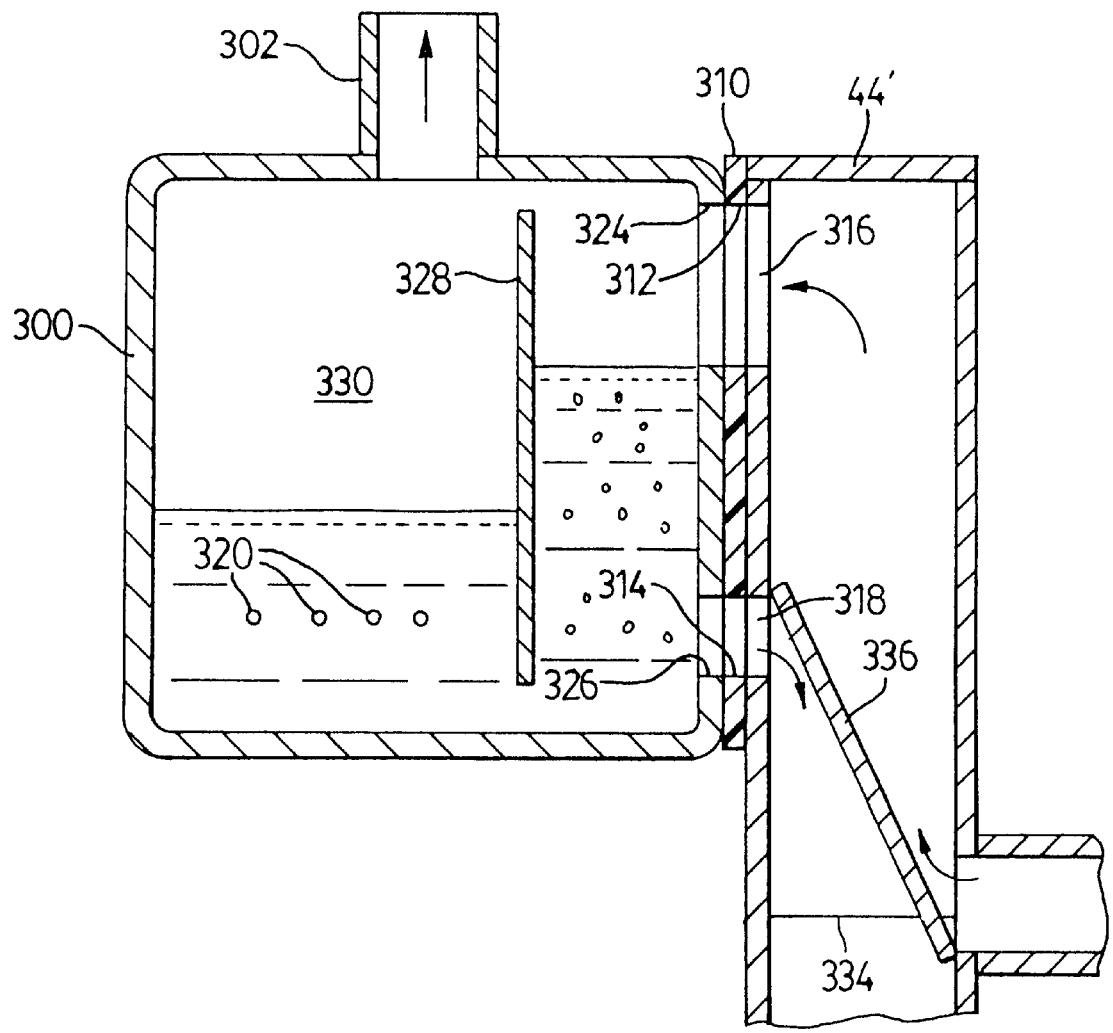
FIG. 15 is a cross sectional view of the header box attached to the rest of the MSE electrolyser shown in FIG. 14.

Referring to FIGS. 14 and 15, an alternative embodiment of an MSE electrolyser includes end boxes 44' adapted to be coupled to a horizontal header box 300. Header box 300 includes a vent 302 for product gas. End boxes 44' are provided with upper and lower apertures 316 and 318 respectively. A gasket 310 with spaced pairs of upper and lower apertures 312 and 314 respectively is sandwiched between header box 300 and end boxes 44'. Referring specifically to FIG. 15, when header box 300 is secured to the end boxes 44' spaced upper and lower apertures 324 and 326 in the header box are in registration with apertures 312 and 314 respectively in gasket 310 and apertures 316 and 318 in the end boxes. A baffle 328 may be used to reduce or prevent electrolyte entering header box 300 from being discharged directly through outlet 302. A heat exchanger coil 320 in chamber 330 is provided for heating or cooling the electrolyte in header 300 as required. Barrier plates 336 in end boxes 44' ensure the fluid exiting the electrolyser stack is directed up to the inlet into header box 300.

Following the arrows indicating direction of fluid flow, gas laden electrolyte spills into end box 44' from the upper fluid passageways of the cell block and rises in the end box where it enters header box 300 through the upper entrance port defined by apertures 316, 312 and 324 in registration. The electrolyte with product gases separated out is recycled back to end box 44' through the lower exit port defined by apertures 318, 314 and 326. The electrolyser including header box 300 advantageously provides mixing of electrolyte between cell stacks of the MSE thereby preventing chemical gradients from building up across the electrolyser. Further, this design permits control of both electrolyte levels 334 and electrolyte temperature in the multiple stacks at only one location.

On shutdown, electrolyte flows back into each end box 44' thereby breaking the liquid, electrolyte circuit between cell stacks. In addition, the use of header box 300 eliminates the need to pump electrolyte into the electrolyser from a separate holding tank, and advantageously avoids dangerously low liquid levels occurring in the electrolyser during shutdown of the electrolyser.

Single Stack Electrochemical System (SSE)

Figure 7:
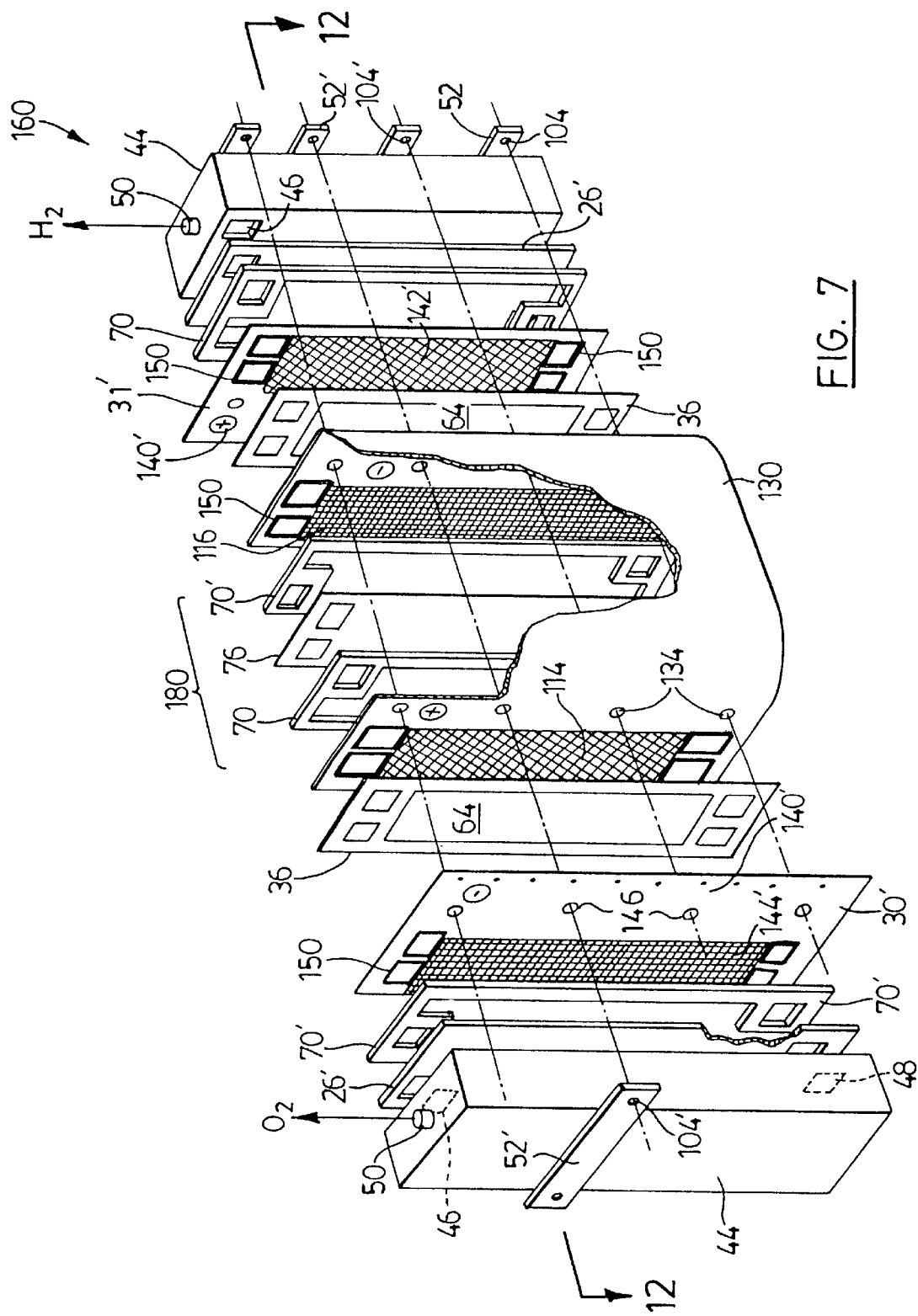
FIG. 7 is a perspective exploded view of a two cell single stack electrolyser (SSE) constructed in accordance with the present invention.

FIG. 7 illustrates another preferred embodiment of a configuration of an electrochemical system shown generally at 160 referred to as the single stack electrochemical system (SSE) configuration which is characterized by the fact that two or more cell compartments are placed one behind another to form a succession, or "string", of cell compartments connected electrically in series. In the present invention the electrical connection between cells is made using a folded double electrode plate 130 so that current passes around the edge of insulating panel 76 of FIG. 10. The anolyte frames 70 and catholyte frames 70' are identical to the corresponding electrolyte frames 38 and 40 in FIG. 4a. Each cell is separated from adjacent cells by an electrolyte frame assembly 180 formed by sandwiching a liquid impermeable panel 76 between the two frames, which will be more fully described hereinafter. External contact from the power supply (not shown) to the electrochemical system 160 is made to single plate electrodes 30'.

Figure 11:
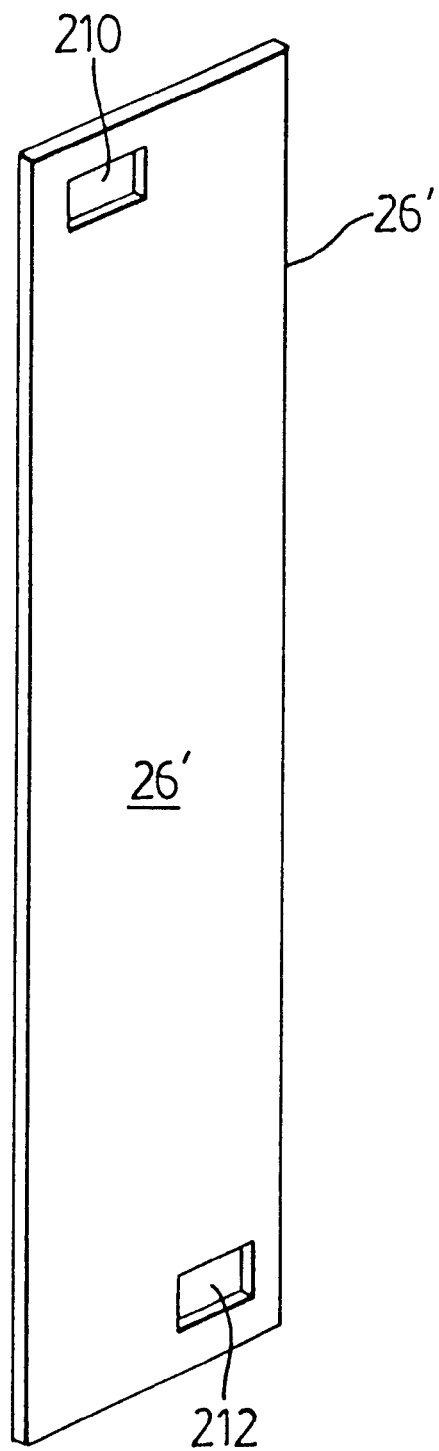
FIG. 11 is a perspective view of an end wall used in the single stack electrolyser of FIG. 7.

Electrochemical system 160 in FIG. 7 comprises two cells so it has one double electrode plate 130 and two single plate electrodes 30' and 31' with one being located at each end of the stack. It will be understood that for a SSE with three cells, two double electrode plates 130 would be required, for an SSE with four cells, three double electrode plates would be required and so on. An insulating panel 26' is used at the ends of the stack adjacent to the end boxes 44 so apertures 210 and 212 (see FIG. 11) in panel 26' are in registration with apertures 46 and 48 in the end boxes.

Figure 8:
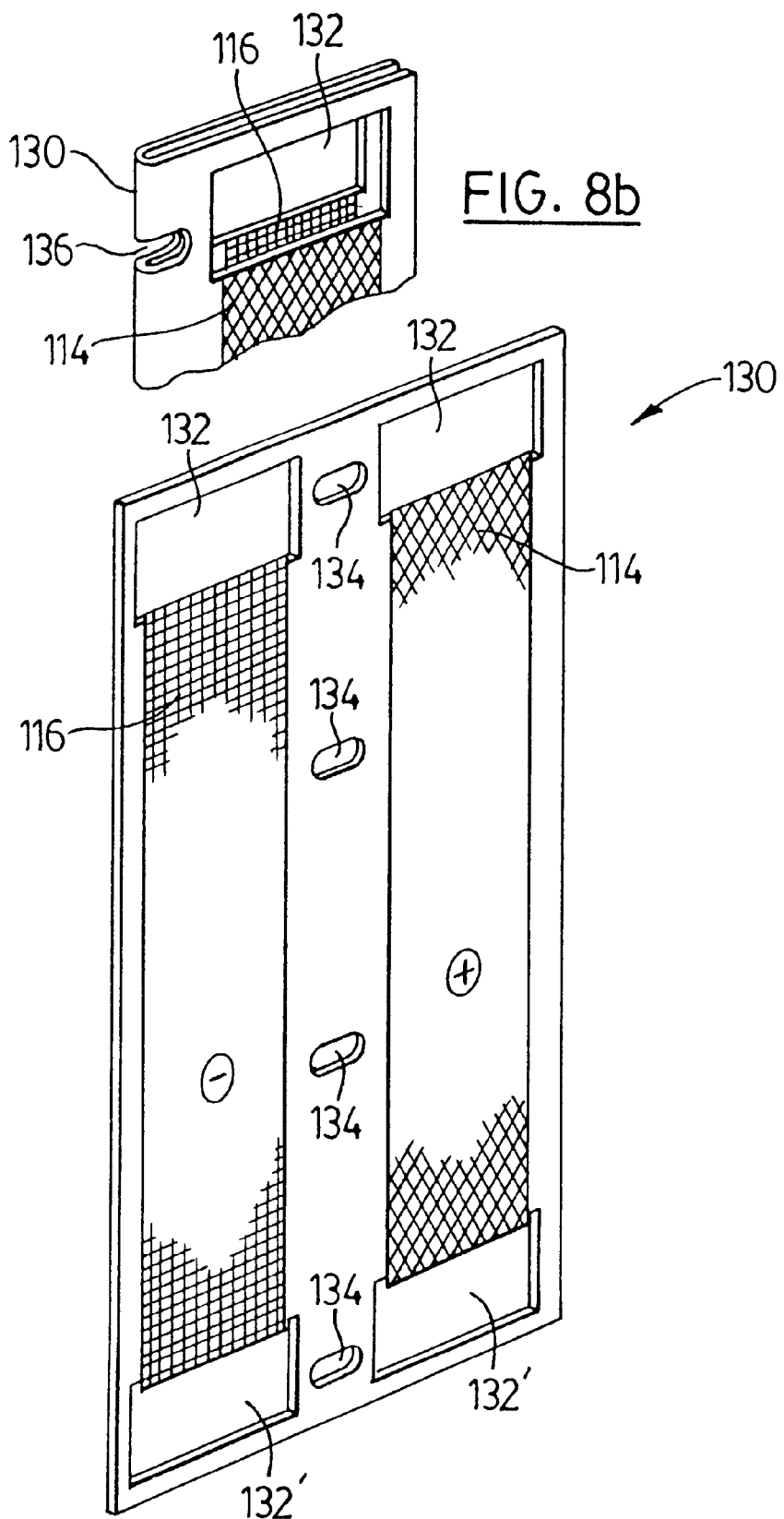
FIG. 8a is a perspective view of a double electrode plate used in the single stack electrolyser illustrated in FIG. 7.
FIG. 8b illustrates the double electrode plate of FIG. 8a folded down its middle by 180°.

FIG. 8a illustrates the geometry of double electrode plate 130 and FIG. 8b shows the same part folded 180° as it would appear in the fully assembled electrochemical system. Referring to FIG. 7, anolyte frame 70, catholyte frame 70' and inter-cell panel 76 are sandwiched between the anode section 114 and cathode section 116 in the assembled electrolyser. Double electrode plate 130 is provided with two upper apertures 132 and two lower apertures 132'. A double apertured gasket 150 (shown in FIG. 9) is positioned in each aperture 132 and 132' to separate the anode from cathode flow channels. Double electrode plate 130 is provided with apertures 134 which form a slot 136 in the folded plate (FIG. 8b) to allow clearance for the tie rods (not shown) when the SSE is assembled as in FIG. 7 before being clamped.

Figure 9:
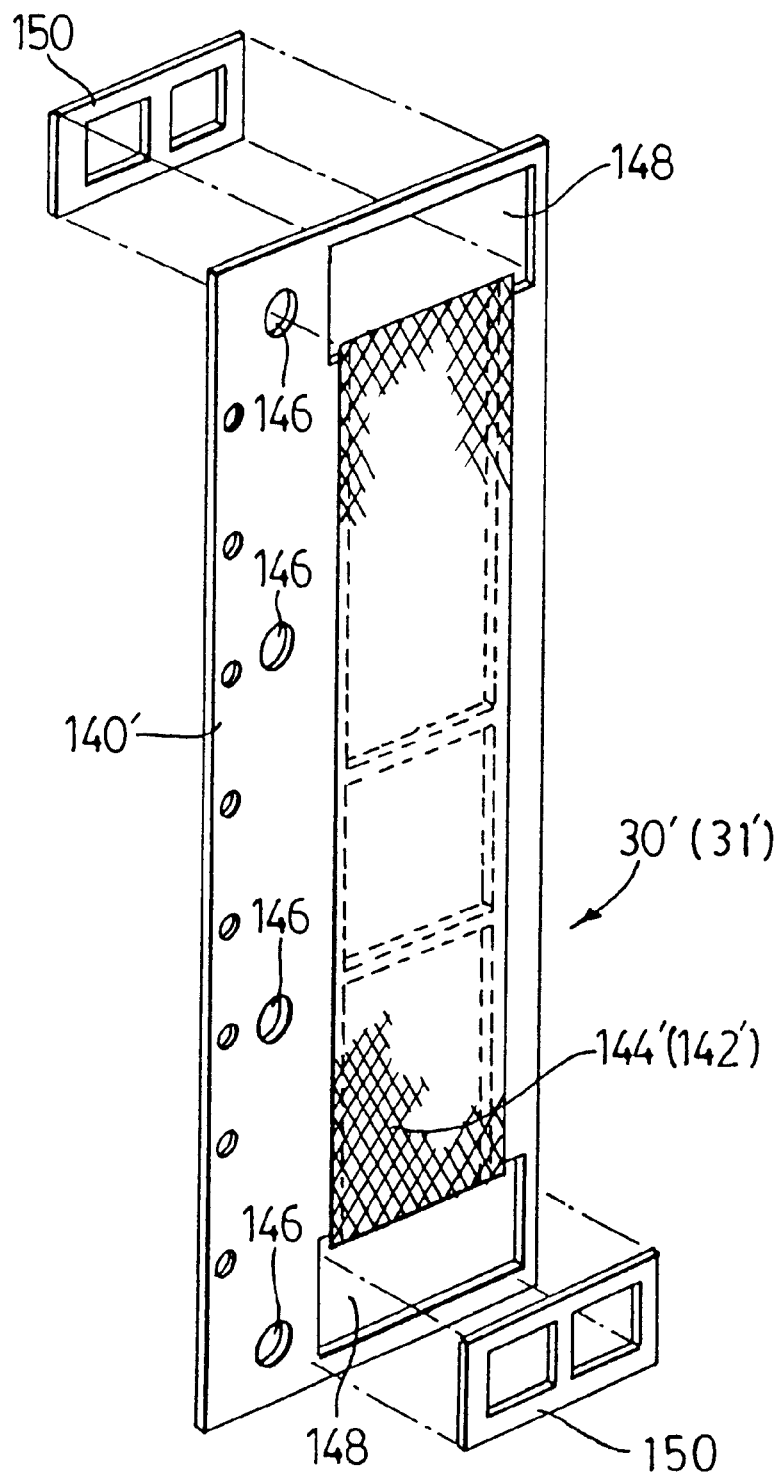
FIG. 9 illustrates a single electrode plate (SEP) used in the single stack electrolyser of FIG. 7.

FIG. 9 illustrates the single electrode plates 30' and 31'. Electrode plate 30' has a cathode 144' attached to frame 140' and plate 31' has an anode 142' attached to its frame 140'. Plates 30' and 31' each have an enlarged aperture 148 at each end of the plate and the elastomer gasket 150 is inserted into each aperture to define two channels or fluid flow conduits. Apertures 148 have the same dimensions as apertures 132 in double electrode plate 130 in FIG. 8a. Holes 146 in section 140' are aligned with slots 136 in the assembled SSE through which the clamping bars are inserted (not shown) for clamping the electrochemical system together.

Figure 10:
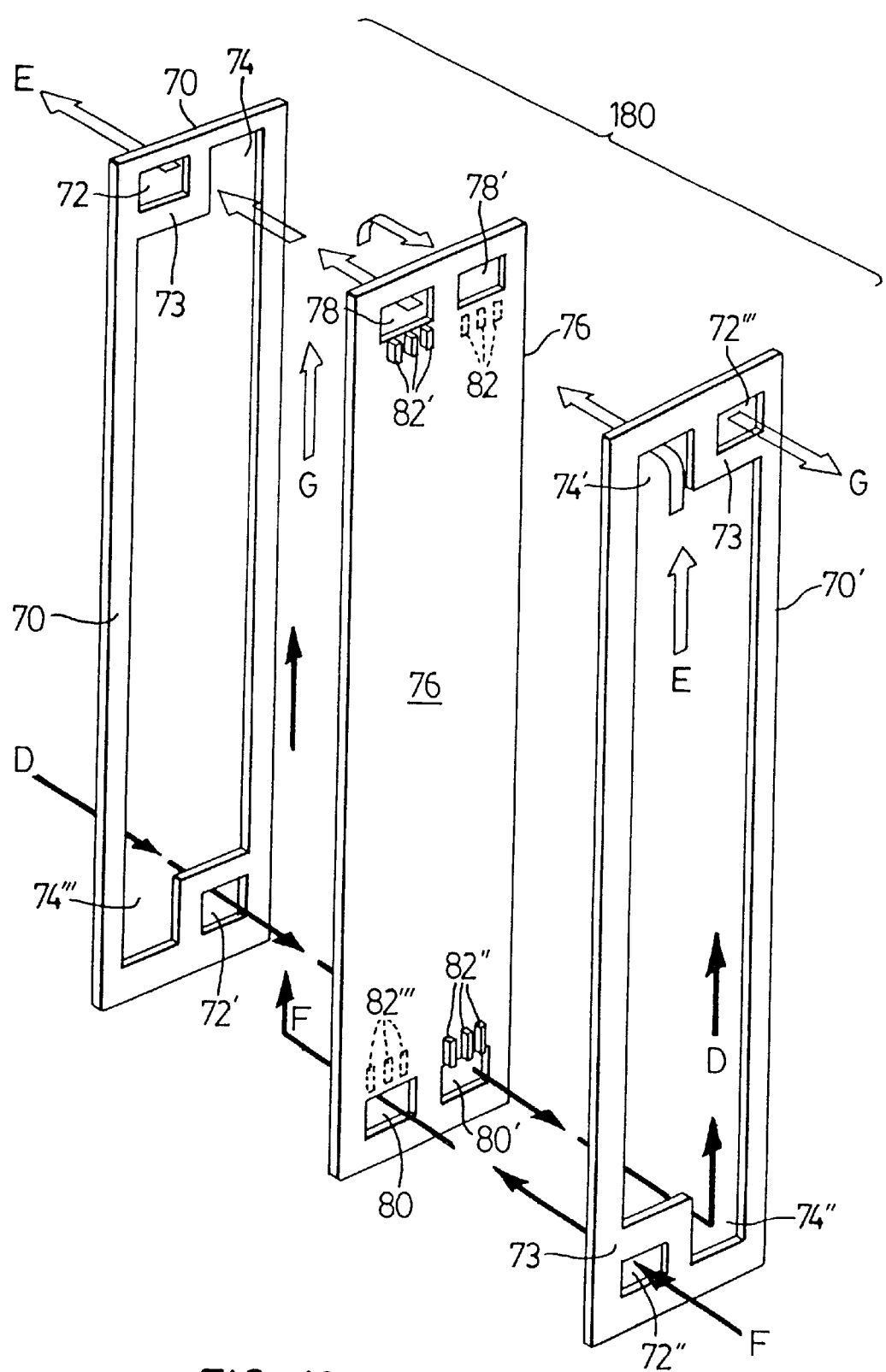
FIG. 10 is a perspective exploded view of an electrolyte frames/partition wall assembly used in the single stack electrolyser (SSE) of FIG. 7.

Referring to FIG. 10, electrolyte frame assembly 180 comprises two peripheral frames 70 and 70'. Frame 70 provided with rectangular webs 73 at each end thereof defining an aperture 72 and an adjacent gap 74 at one end of the frame and an aperture 72' and adjacent gap 74''' at the other end of the frame. Similarly, frame 70' is also provided with rectangular webs 73 at each end portion thereof defining an aperture 72" and adjacent gap 74" at one end of the frame and an aperture 72''' and adjacent gap 74' at the other end of the frame. The peripheral frames 70 and 70' have a similar design as the electrolyte frames 38 and 40 of the multiple stack electrolyser (MSE) shown in FIG. 4a. Apertures 72 and 72' are located in diagonal corners with respect to each other in frames 70 and 70' and define fluid flow paths. These flow paths are aligned with holes 46 and 48 in the end boxes 44 to provide a fluid circulation path through the cell stack and from the cell stack to the end boxes 44. Frame members 70 and 70' provide a liquid seal when the electrode assembly is assembled and the cell stack completed.

Liquid impermeable panel 76 is sandwiched between the two frames 70 and 70' and the three components are welded or otherwise bonded together. Panel 76 is provided with a pair of apertures 78 and 78' at one end and a pair of apertures 80 and 80' at the other end which act as fluid conduits. At the upper end of panel 76 two sets of channel supports 82 and 82' are bonded to or otherwise fixed to the panel below apertures 78' and 78 respectively, with one set of supports 82 being located on one face of the panel and another set of supports 82' being located on the opposite face and extending in the other direction. The same configuration applies to the two pairs of channel supports 82" and 82''' located above apertures 80 and 80' located at the lower end of the panel.

When assembly 180 is assembled, the channel supports 82 and 82' protrude within gaps 74 and 74', respectively, at the upper end of the assembly. Similarly, at the lower end of the assembly the channel supports 82" and 82''' penetrate within the gaps 74" and 74''' respectively. Such an assembly may be a one-piece part made for example by injection molding.

The apertures in the various components of SSE 160 are in registration (similar to each stack of the MSE of FIG. 2) to provide flow communication between the end boxes 44 and the anolyte and catholyte chambers adjacent the anode 142' and cathode 144'. It is noted that the difference between the MSE of FIG. 2 and the SSE of FIG. 7 relates to the fact that in the SSE 160 the electrodes alternate, anode/cathode/anode throughout the stack so that panel 76 is required between the anode and cathodes on electrode 130, while in the MSE adjacent pairs of anodes or cathodes in adjacent cells can share a common anolyte or catholyte chamber. Therefore, referring again to FIG. 7, catholyte fluid returning from the end box 44 circulates through apertures 72', 80' and through the passageways created by the channel supports 82" within gap 74", following arrows D. The fluid mixture comprising catholyte and product exits from the catholyte chamber defined by frames 70' adjacent to the cathode (not shown) to the end box 44 for degassing through the channel supports 82' within gap 74', apertures 78 and 72, following arrow E.

Similarly, the anolyte fluid returning from the end box 44 at the other end of the stack circulates through apertures 72", 80 and up through the passageways created by the channel supports 82''' within gap 74''', following arrows F. The fluid mixture comprising anolyte and product exits from the anolyte chamber defined by frames 70 adjacent to the anode (not shown) to the end box 44 for degassing through the channel supports 82 within gap 74, apertures 78' and 72''', following arrows G.

The two anolyte flow paths and two catholyte flow paths are independent of each other except for electrolyte migration across separator 64 to minimize mixing between anolyte and catholyte. In addition, in the MSE, fluid flow is through the stack and not between individual stacks. Separator 64 is a gas separator in the case of electrolysis to prevent product $H_2$ and $O_2$ mixing.

The material of construction of frames 70 and 70' preferably has both the properties of a rubber gasket and the hardness of a suitable engineering plastic, a material similar to that of gas separator 36 and electrolyte frames 38 and 40, i.e. materials such as polyurethane/polyether, polyolefin, and polytetramethylene glycol ether with durometers chosen to meet the purpose with the same processing advantages. Such materials can be processed in a number of ways including die cutting from extruded material or injection moulding. A further advantage of this process is the compatibility of full face elastomer frame/gaskets with the metal electrodes. No additional gasket is required. Frames 70 and 70' are identical since rotating frame 70 180° about its longitudinal axis gives frame 70'. In this way both anolyte frame 70 and catholyte frame 70' can be produced using a common frame part. Insulating panels 76 and 26' may be made from the same material used in the electrolyte circulation frames 38, 40 and 70, 70'.

The various cell components are assembled and then clamped together with sufficient force to achieve mechanical integrity and leak-tightness between all the components of the cell stack. The clamping is accomplished by means of a system of tie rods (not shown) through holes 104' in clamping bars 52', see FIG. 7.

Figure 12:
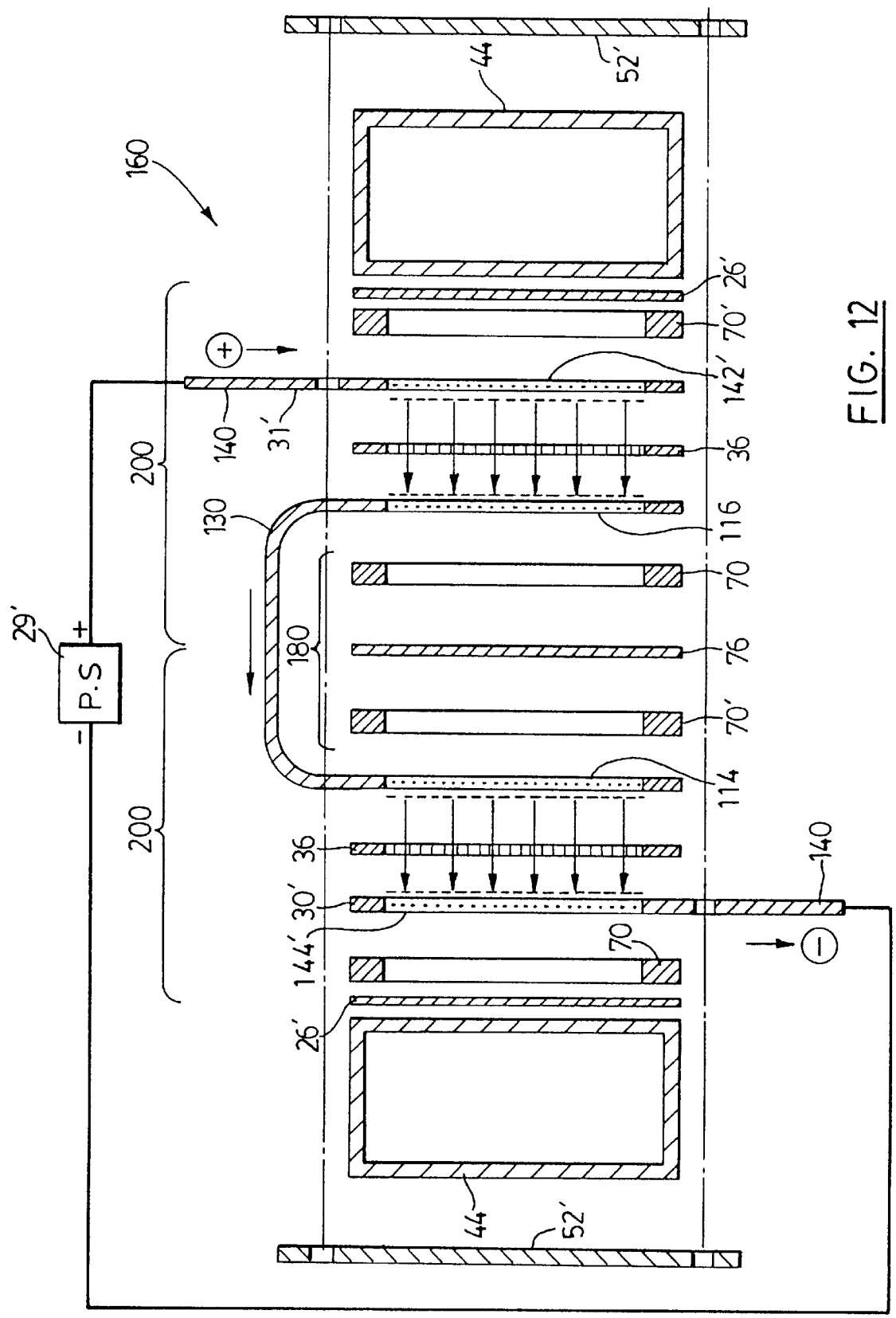
FIG. 12 is a horizontal cross section along the line 12—12 of FIG. 7 showing the electrical current path through the single stack electrolyser cell block.

The horizontal cross section in FIG. 12 shows the current flow through the cell which distinguishes this electrochemical system configuration as a mono-polar cell assembly.

When two or more cells are connected in series within the same electrochemical system, electrode pairs in each cell must be completely electrically insulated from the next. The electrolytes must also be at least partially confined within the "boundary" of a given cell in order to minimize the amount of catholyte, for example, of one cell compartment mixing with the catholyte of the next cell compartment. Such mixing is prone to formation of electrical circuits being created outside of the reaction chambers, resulting in a path for current to flow that reduces cell current efficiency and product purity. Cells connected in series must therefore include in their functional assembly a partition wall on each side to control the amount of electrolyte mixing. The same partition wall may be shared by two successive cells to form an inter-cell wall or insulating cell wall 76, as shown in FIG. 10.

The use of the double electrode plate is highly advantageous for several reasons. In both electrochemical system configurations shown in FIGS. 1 and 7, it is noted that each may be characterized as mono-polar cell arrangements in which the double electrode plates 110 and 130 respectively are shared by different cells isolated from one another, in the case of the MSE configuration by an air gap, and in the SSE configuration by an insulating wall, and the current flow in the electrode is in the plane of the electrode. Such a design advantageously makes use of parallel-series configuration through efficiently passing the current from one end of the series of parallel stacks to the other end.

Since current is injected to one electrode on the DEP in one cell from along the edge of the conducting frame of the double electrode plate and transferred to the other electrode supported on the DEP in an adjacent cell by the conductive frame portion between the electrodes, there is no need for external point-to-point connections between cells in either the MSE or SSE. This eliminates a significant source of efficiency loss characteristic of electrolysers using point-to-point connections. In other words, as in the conventional mono-polar design, the current flow in the electrode is only in the plane of the electrode and the current flows between adjacent cells occurs outside the cell stack but unlike the conventional mono-polar systems where current flows from a point of connection over the surface of the electrode, the electrical connection to the cells in the present electrochemical systems is made by the underlying DEP plate, wherein are realized the advantages of the present designs over the conventional systems in terms of thickness of the electrode at the point of connection and the costs of mechanically joining the two parts.

The present invention permits double electrode plates to be used that are thinner than the plates required in the conventional designs characterized by point-to-point connections between cells. The thickness of the DEP in the present systems is determined by the current density required for the reactions occurring at the electrodes. Further, the width of the conducting web portion of the electrically conducting frame connecting the two portions of the DEP supporting the two electrodes may be varied depending on the physical requirements of the SSE, MSE or any other system in which the DEP is being used.

Another significant advantage of the mono-polar cell stack designs using the double electrode plate disclosed herein, is that the cells do not necessarily require forced electrolyte circulation to maintain adequate electrolyte supply between electrodes as is often needed in other "filter press" (bi-polar) type electrolysers. By careful sizing of electrolyte channels and selection of the number of cells per stack adequate circulation is established to ensure a low inter-electrode resistance factor and to ensure that voidage does not occur which can lead to hot spots and damage to the electrolyser. In the mono-polar cell stack using the double electrode plate the hydrodynamics of electrolyte circulation are optimized against channel size and the afore-mentioned advantages of compact size can be realized without the need for a mechanical pump. without a mechanical pump the cells need not be flooded as in conventional bi-polar designs and the separation of gas from entrained electrolyte can occur at the top of the electrolyser rather than in a separate chamber.

Figure 13A:
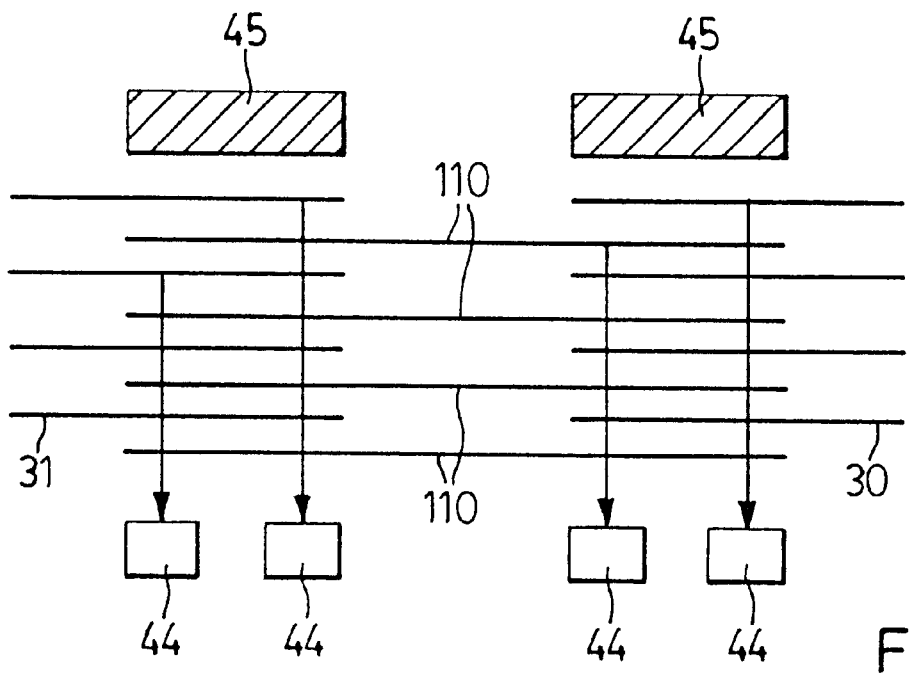
FIGS. 13(a) and 13(b) illustrate different alternative electrolyser configurations constructed in accordance with the present invention.
Figure 13B:
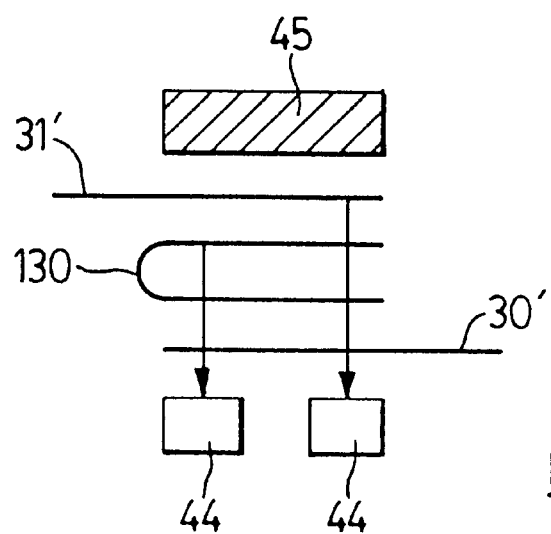

Variations in the arrangements of the rigid end box compartments are possible for example whereby the two product gases are collected at one end with the two end boxes 44 placed side by side at the one end and a rigid plate 45 at the other end rather than where the boxes are located at either end of the stack, as shown in FIG. 13(a) for the MSE and in FIG. 13(b) for the SSE. Because of the mono-polar nature of the cells in both types of electrolysers the current flow in the electrodes is parallel to the working face of the double electrode plates 110 and single electrode plates 30 and 31 (and perpendicular to the direction of the gas flow in the electrolyte channels (not shown) through the electrolysers.

While the various embodiments of the electrochemical cells and system configurations disclosed herein have been exemplified using alkaline or acid water electrolysis (electrolysers) as an example, it will be understood by those skilled in the art that systems for performing other electrochemical processes may also be constructed using the various components disclosed herein. These other electrochemical processes include, but are not limited to, other electrosynthesis reactions, fuel cells devices and energy storage batteries to mention just a few. Details of the design of double electrode plate 110 would be varied according to system requirements, such as the number and location of apertures forming the flow passageways, dimensions of the electrically conducting frame and electrodes to mention just a few.

Therefore, the foregoing description of the preferred embodiments of the method and apparatus of the invention have been presented to illustrate the principles of the invention and not to limit the invention to the particular embodiment illustrated. It is intended that the scope of the invention be defined by all of the embodiments encompassed within the following claims and their equivalents.

Therefore what is claimed is:

1. A single stack electrochemical system, comprising:
    a) n cells arranged serially in a cell stack wherein n is an integer number of cells greater than or equal to 2, each cell including at least one anode electrode and an anolyte chamber adjacent thereto and a cathode electrode and a catholyte chamber adjacent thereto, two cells being located at opposed ends of said stack with one of said two cells including at least a contact anode electrode and the other of said two cells including at least a contact cathode electrode, said contact anode and contact cathode electrodes being adapted to be connected to a power supply, including an insulating member for insulating adjacent cells in said stack;
    b) n–1 double electrode plates, each double electrode plate including a least an electrically conducting frame having a length and a width, and a first portion for supporting an anode electrode located in one of said cells and a second portion for supporting a cathode electrode located in an adjacent cell, and a web portion between said anode and cathode electrodes electrically connecting said electrodes, and wherein at least a portion of said web portion is located exterior to the cells containing the anode and cathode electrodes supported by said double electrode plate, said double electrode plate being folded substantially down a middle of said web portion, and when a voltage drop is developed between said two contact electrodes current is collected along said length of said electrically conducting frames and flows from cell to cell in a plane of said double electrode plates across the width of the electrically conducting frames and said anode and cathode electrodes; and c) first and second rigid support members located at opposed ends of said cell stack, said cell stack being compressed between said first and second rigid support members, said first rigid support member defining a first enclosure and said second support member defining a second enclosure, said first enclosure being in flow communication with the first and second flow passageways in flow communication with each anolyte chamber in said cell stack, and said second enclosure being in flow communication with the third and fourth flow passageways in flow communication with each catholyte chamber in said cell stack.

2. The single stack electrochemical system according to claim 1 wherein said contact anode and cathode electrodes are single electrode plates each including at least two single electrode plates having an electrically conducting frame, said electrically conducting frame having a length and a width.

3. The single stack electrochemical system according to claim 2 wherein the length of the electrically conducting frames of the double electrode plate and the single electrode plates is greater than the width of each, and wherein said anode and cathode electrodes supported on said single electrode plates and said double electrode plates each have a length and a width, said length being greater than said width.

4. The single stack electrochemical system according to claim 3 wherein said first and second portions of the double electrode plate each include at least opposed faces, each of said opposed faces including a planar peripheral surface extending about a periphery of the supported anode and cathode electrodes, and wherein the electrically conducting frame of the single electrode plate includes opposed faces and a planar peripheral surface on each of the opposed faces extending about a periphery of the anode or cathode supported on said single electrode plate.

5. The single stack electrochemical system according to claim 4 wherein each cell includes at least a separator between the catholyte and anolyte chambers, and including at least one flow passageway connecting said catholyte chambers and at least one flow passageway connecting said anolyte chambers.

6. The single stack electrochemical system according to claim 5 wherein said separator includes at least a peripheral frame, said peripheral frame being sealingly engaged between the planar peripheral surface of one of the opposed faces of the electrically conducting support frame holding said anode electrode and the planar peripheral surface of one of the opposed faces of the electrically conducting support frame supporting said cathode electrode in each cell.

7. The single stack electrochemical system according to claim 6 wherein each cell includes an anolyte chamber forming frame member sealingly engaged to the planar peripheral surface of the other of said opposed faces of the conducting support frame supporting said anode electrode, and a catholyte chamber forming frame member sealingly engaged to the planar peripheral surface of the other of said opposed faces of the conducting support frame supporting said cathode electrode.

8. The single stack electrochemical system according to claim 7 wherein said anolyte and catholyte chamber forming frame members, the peripheral frame of the separator and a peripheral frame of said insulating member are fabricated of a compressible elastomer-like material, and wherein said anolyte and catholyte chamber forming frame members, said peripheral frames of said insulating member and said separator are compressed to form fluid tight seals when said electrochemical system is assembled.

* * * * *